United States Patent
Kurokawa et al.

(10) Patent No.: US 8,880,094 B2
(45) Date of Patent: Nov. 4, 2014

(54) BROADCAST DISTRIBUTION CONTROL DEVICE, CALL STATUS CONTROL DEVICE, FEMTO CELL BASE STATION, COMMUNICATION SYSTEM, METHOD AND PROGRAMME

(75) Inventors: Osamu Kurokawa, Minato-ku (JP); Yasuhiro Watanabe, Minato-ku (JP); Hiroaki Akiyama, Minato-ku (JP); Daisuke Nakamura, Minato-ku (JP); Takeshi Nishimura, Minato-ku (JP); Takuo Akimoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 168 days.

(21) Appl. No.: 13/522,874

(22) PCT Filed: Dec. 22, 2010

(86) PCT No.: PCT/JP2010/073156
§ 371 (c)(1),
(2), (4) Date: Nov. 28, 2012

(87) PCT Pub. No.: WO2011/089819
PCT Pub. Date: Jul. 28, 2011

(65) Prior Publication Data
US 2013/0065606 A1   Mar. 14, 2013

(30) Foreign Application Priority Data
Jan. 19, 2010   (JP) ................. 2010-009414

(51) Int. Cl.
*H04W 24/00* (2009.01)
*H04L 29/06* (2006.01)
*H04W 84/04* (2009.01)
*H04W 4/06* (2009.01)
*H04W 76/00* (2009.01)
*H04W 4/22* (2009.01)

(52) U.S. Cl.
CPC ......... *H04L 65/1016* (2013.01); *H04W 84/045* (2013.01); *H04W 4/06* (2013.01); *H04L 65/105* (2013.01); *H04L 65/1006* (2013.01); *H04W 76/007* (2013.01); *H04W 4/22* (2013.01)
USPC .................. 455/456.1; 455/404.1; 455/404.2; 455/414.2; 455/414.3

(58) Field of Classification Search
CPC .... H04W 4/22; H04W 84/045; H04W 76/007
USPC ........... 455/456.1, 404.1, 404.2, 414.2, 414.3
See application file for complete search history.

(56) References Cited

U.S. PATENT DOCUMENTS

2008/0046593 A1   2/2008   Ando et al.
2008/0293382 A1*  11/2008   Lubenski et al. ............. 455/411

(Continued)

FOREIGN PATENT DOCUMENTS

| JP | 2004-240708 A | 8/2004 |
|----|---------------|--------|
| JP | 2006-325174 A | 11/2006 |

(Continued)

OTHER PUBLICATIONS

Office Action dated Dec. 10, 2013 issued by the Japanese Patent Office in counterpart Japanese Patent Application No. 2010009414.

(Continued)

*Primary Examiner* — Barry Taylor
(74) *Attorney, Agent, or Firm* — Sughrue Mion, PLLC

(57) ABSTRACT

Provided is a broadcast control apparatus that realizes broadcasting to a predetermined distribution area, as in an existing public mobile communication network in a communication system using a femto cell base station. The broadcast control apparatus includes a database, in which location information of the femto cell base station existing in a predetermined distribution area section is associated with the distribution area section. The broadcast control apparatus also includes update means for updating the association in the database based on the location information of the femto cell base station received by reception means.

18 Claims, 18 Drawing Sheets

| Case | EVENT BEFORE 3rdPatyREG | OPERATION TO S-CSCF | OPERATION TO AS | OPERATION EXPECTED FOR AS |
|------|-------------------------|---------------------|-----------------|---------------------------|
| #1 | PERIODIC ReREG FROM FAP | ReREG FROM FAP | ReREG TO AS | CONTINUE |
| #2 | MOVE TO ANOTHER Femto | REG FROM FAP | REG TO AS | UPDATE FAP ADDRESS/GEO/SAI |
| #3 | RE-Attach AFTER FAP REBOOT | REG FROM FAP | REG TO AS | UPDATE FAP ADDRESS |
| #4 | IMSI.detach | deREG FROM FAP | deREG TO AS | DELETE |
| #5 | MOVE TO Macro | Cx-RTR FROM HSS | NOTIFY AS | DELETE |
| #6 | CANCELLATION OF CONTRACT BY USER | Cx-RTR FROM HSS | NOTIFY AS | DELETE |

(56) References Cited

U.S. PATENT DOCUMENTS

2009/0291630 A1* 11/2009 Dunn et al. .................. 455/3.01
2009/0311987 A1* 12/2009 Edge et al. ................. 455/404.1
2011/0034182 A1* 2/2011 Issa et al. ................... 455/456.3

FOREIGN PATENT DOCUMENTS

| | | |
|---|---|---|
| JP | 2007202083 A | 8/2007 |
| JP | 2008-035250 A | 2/2008 |
| JP | 2008236651 A | 10/2008 |
| JP | 2008301412 A | 12/2008 |
| JP | 2009-504051 A | 1/2009 |
| JP | 2009-130558 A | 6/2009 |
| JP | 2009536408 A | 10/2009 |
| WO | 2009043389 A1 | 4/2009 |

OTHER PUBLICATIONS

International Search Report of PCT/JP2010/073156 dated Jan. 25, 2011.

* cited by examiner

Fig.4
(a) AREA MANAGEMENT IMAGE OF Macro CELL IN EXISTING 3G NETWORK
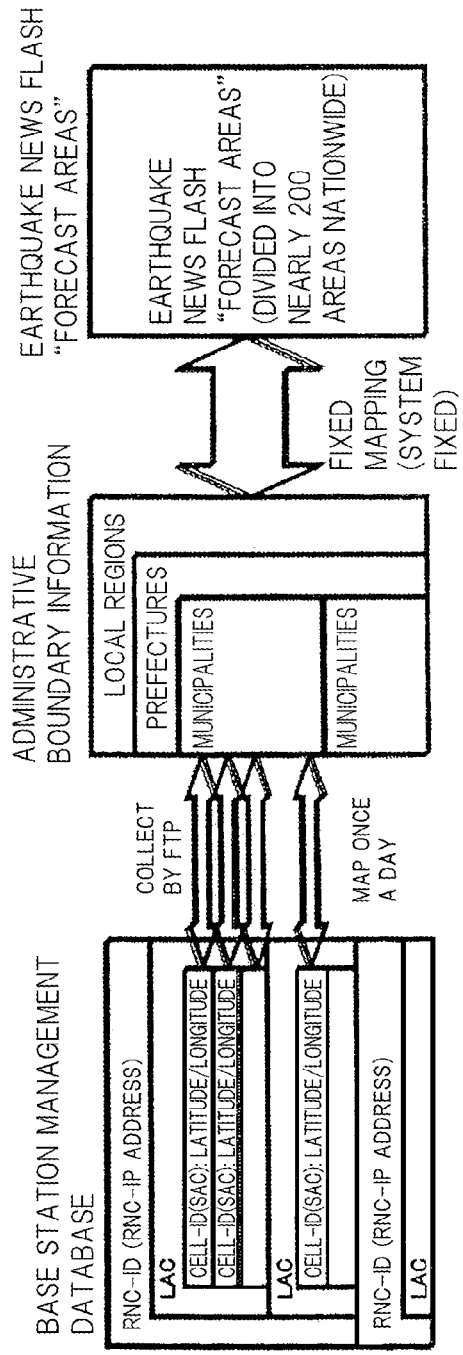
(b) AREA MANAGEMENT IMAGE OF Femto CELL
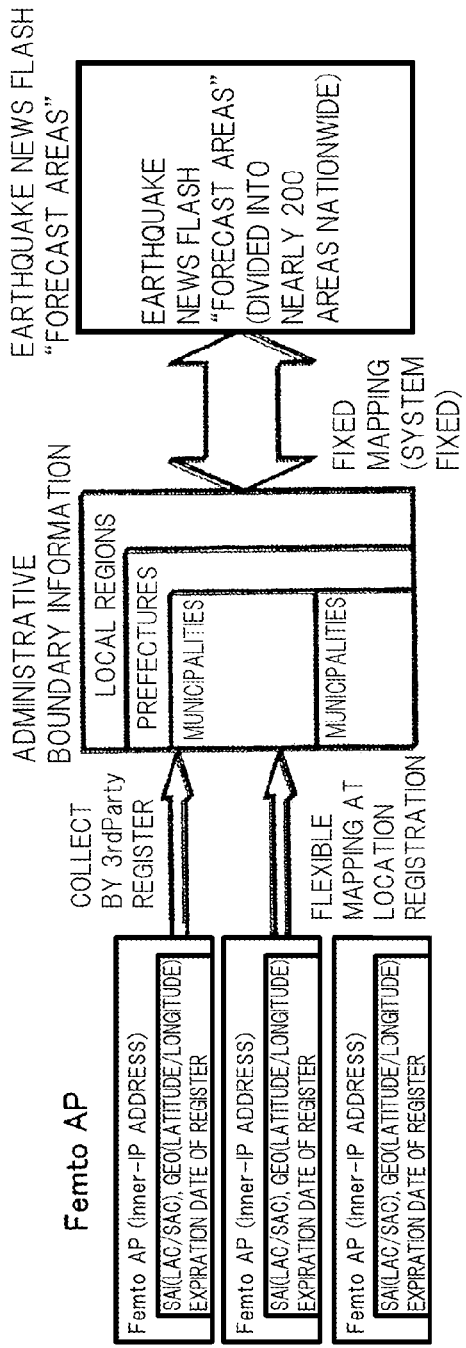

Fig.5

SAI

```
440 XX  YYYY ZZZZZ
----- --- ------ -------
MCC MNC LAC  SAC
```

Fig.6

| GEOarea | |
|---|---|
| locationEstimate | : 850b303156a560978136362d43 |
| +-Ext-GeographicalInformation | : 850b303156a560978136362d43 |
| +-type of Shape | = 3 : Ellipsoid point with uncertainty Ellipse |
| +-sign of latitude | = 0 : North |
| +-degrees of latitude | = 0x3156a5 : 34 |
| +-degrees of longitude | = 0x609781 : 135 |
| +-uncertainty semi-major | = 0x36 : 1 km |
| +-uncertainty semi-minor | = 0x36 : 1 km |
| +-orientation | = 45 : 45 degrees |
| +-confidence | = 67 : 67 % |

Fig.7

| Case | EVENT BEFORE 3rdPatyREG | OPERATION TO S-CSCF | OPERATION TO AS | OPERATION EXPECTED FOR AS |
|---|---|---|---|---|
| #1 | PERIODIC ReREG FROM FAP | ReREG FROM FAP | ReREG TO AS | CONTINUE |
| #2 | MOVE TO ANOTHER Femto | REG FROM FAP | REG TO AS | UPDATE FAP ADDRESS/GEO/SAI |
| #3 | RE-Attach AFTER FAP REBOOT | REG FROM FAP | REG TO AS | UPDATE FAP ADDRESS |
| #4 | IMSI.detach | deREG FROM FAP | deREG TO AS | DELETE |
| #5 | MOVE TO Macro | Cx-RTR FROM HSS | NOTIFY AS | DELETE |
| #6 | CANCELLATION OF CONTRACT BY USER | Cx-RTR FROM HSS | NOTIFY AS | DELETE |

Fig.8

| | EXAMPLE OF CONFIGURATION 1 | EXAMPLE OF CONFIGURATION 2 | EXAMPLE OF CONFIGURATION 3 |
|---|---|---|---|
| TRANSMIT 3rd party register | S-CSCF → AS (AT LOCATION REGISTRATION) | FAP → AS (AT LOCATION REGISTRATION) | FAP → AS (AT IP Sec TUNNEL ESTABLISHMENT) |
| MAIN MERIT | APPLICABLE TO EXISTENCE/NONEXISTENCE MANAGEMENT AND IMS SUPPLEMENTARY SERVICE BECAUSE NOT ONLY CBS, BUT ALSO END USER INFORMATION (UE.IMSI) IS MANAGED. | APPLICABLE TO EXISTENCE/NONEXISTENCE MANAGEMENT AND IMS SUPPLEMENTARY SERVICE BECAUSE NOT ONLY CBS, BUT ALSO END USER INFORMATION (UE.IMSI) IS MANAGED. | APPLICABLE NOT ONLY TO IMS SYSTEM, BUT ALSO TO RAN-GW SYSTEM. |

| UE | IMSI | MSISDN | GEOarea | SAI | FAP IP Address |
|----|------|--------|---------|-----|----------------|
| A | A | A | FAP_a | FAP_a | FAP_a |
| B | B | B | FAP_a | FAP_a | FAP_a |
| C | C | C | FAP_a | FAP_a | FAP_a |
| D | D | D | FAP_a | FAP_a | FAP_a |
| E | E | E | FAP_b | FAP_b | FAP_b |
| F | F | F | FAP_b | FAP_b | FAP_b |
| G | G | G | FAP_b | FAP_b | FAP_b |
| H | H | H | FAP_b | FAP_b | FAP_b |

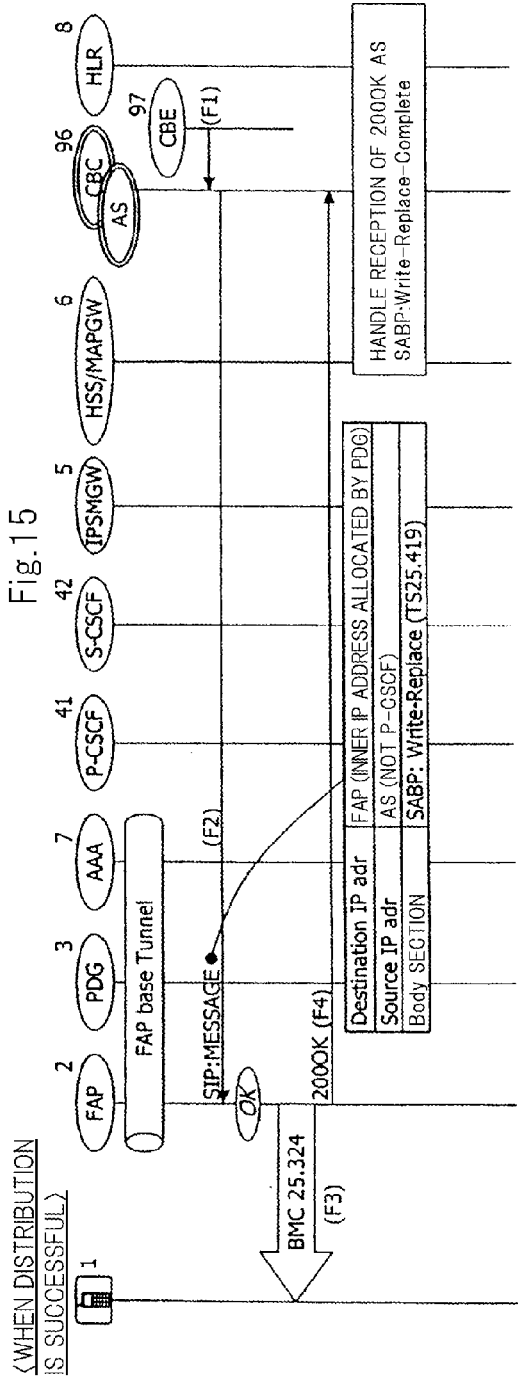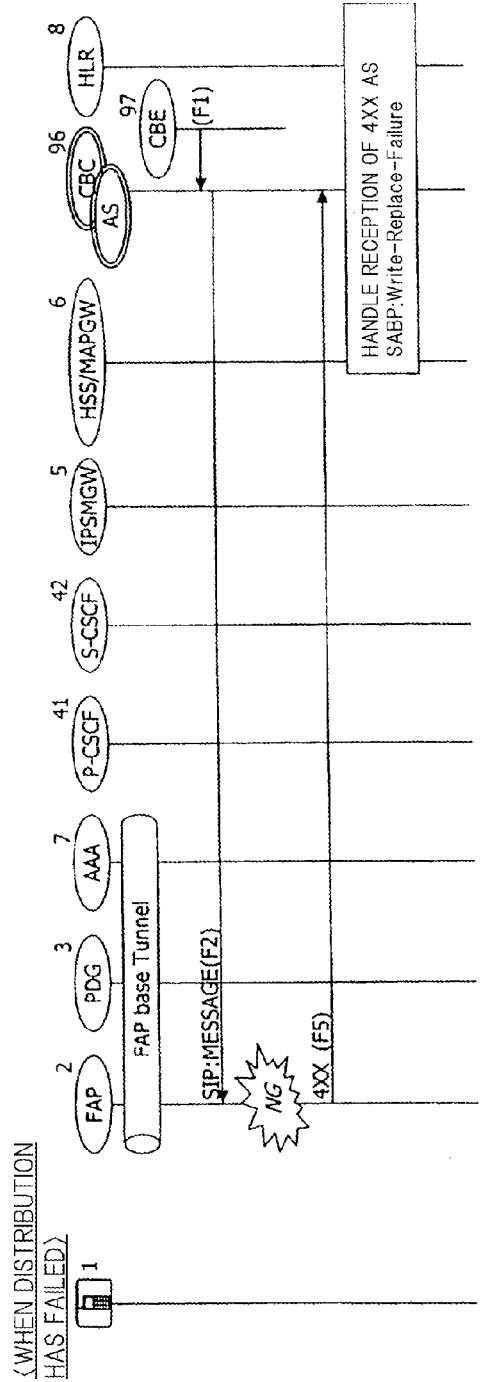
Fig.15

BROADCAST DISTRIBUTION CONTROL DEVICE, CALL STATUS CONTROL DEVICE, FEMTO CELL BASE STATION, COMMUNICATION SYSTEM, METHOD AND PROGRAMME

CROSS REFERENCE TO RELATED APPLICATIONS

This application is a National Stage of International Application No. PCT/JP2010/073156 filed Dec. 22, 2010, claiming priority based on Japanese Patent Application No. 2010-009414 filed Jan. 19, 2010, the contents of all of which are incorporated herein by reference in their entirety.

TECHNICAL FIELD

The present invention relates to a broadcast control apparatus, a call state control apparatus, a femto cell base station, a communication system, a method, and a program used for a communication system including a broadcast function of broadcasting an earthquake news flash, disaster information, and the like to a wireless terminal (UE; user equipment) in a predetermined distribution area.

BACKGROUND ART

Generally, in Cell Broadcast Service (CBS), a CBS message is broadcasted to all UE in a specific geographical area. The regional area is, for example, a region where the seismic intensity is greater than a predetermined value in the case of an earthquake news flash service.

Hereinafter, a distribution operation of the CBS message in a 3G (third generation: third generation mobile communication) network, which is a public mobile communication network for connecting a call of UE such as a cell phone, will be described with reference to FIG. 1.

In the 3G network, CBC (Cell Broadcast Center) that distributes the CBS message uses the cell ID of RNC (Radio Network Controller) to manage the distribution target area for broadcasting. When a distribution instruction of the CBS message is received from CBE (Cell Broadcast Entity), which is a server managed by the Meteorological Agency, municipalities, and the like, CBC distributes the CBS message to each RNC, which manages the cells in the distribution target area, based on the cell ID.

Each RNC that has received the CBS message distributes the CBS message to UE existing under the control of BTS (Base Transceiver Station) in the cell of the RNC and then returns a notification of the success of the distribution of the CBS message to CBC. In this way, the CBS message is broadcasted to each UE as a target of the distribution.

In one of the 3G networks, information distributed by an arbitrary mobile station can be distributed to another mobile station located in the distribution target area through CBC (see Patent Literature 1).

In recent years, a femto cell technique for connecting UE to a mobile communication core network through a wire line installed at home, office, or the like is drawing attention.

In the femto cell technique, a femto cell base station (Femto AP) that covers a narrow communication area of about several dozen meters in radius is connected to the wire line and is further wirelessly connected to UE to intervene between UE and the wire line. The installation of the femto cell base station indoors, such as at home or office, allows wireless communication without the development of the infrastructure of a macro cell base station (see Patent Literature 2).

Citation List

Patent Literature

[Patent Literature 1] JP2009-130558A
[Patent Literature 2] JP2009-504051A

SUMMARY OF INVENTION

Technical Problem

In the technique described in Patent Literature 1 and the technique using the 3G network, the installation location of RNC is fixed. Therefore, the cell ID can be used to uniquely associate the distribution target area with RNC, and CBC can identify the RNC that covers the distribution target area. However, in the technique described in Patent Literature 1 and the technique using the 3G network, a configuration of implementing the femto cell is not taken into consideration, and the following problem occurs. More specifically, the installation location of the femto cell base station is not always fixed, and CBC cannot identify the femto cell base station covering the distribution target area. Therefore, CBC cannot manage the distribution target area and cannot perform broadcast communication for a predetermined distribution target area.

In Patent Literature 2, although there is a description of communication using the femto cell base station, the realization of the CBS message distribution as in an existing public mobile communication network is not taken into consideration.

The present invention has been made in view of the foregoing circumstances, and an object of the present invention is to provide a broadcast control apparatus, a call state control apparatus, a femto cell base station, a communication system, a method, and a program of the apparatus capable of broadcasting to a predetermined distribution area in a communication system using a femto cell base station, as in a communication system using an existing public mobile communication network.

Solution to Problem

The present invention provides a broadcast control apparatus that performs broadcasting to a wireless terminal wirelessly connected to a femto cell base station, the broadcast control apparatus comprising: reception means for receiving location information of the femto cell base station; a database that stores a predetermined distribution area by associating the distribution area with the location information of the femto cell base station that is present in the distribution area; and update means for updating the association in the database based on the location information received by the reception means.

The present invention provides a call state control apparatus connected to a femto cell base station and a broadcast control apparatus that performs broadcasting to a wireless terminal wirelessly connected to the femto cell base station, the call state control apparatus comprising: location information reception means for receiving a SIP (Session Initiation Protocol) message including location information of the femto cell base station; and location information transmission means for transmitting the SIP message including the location information of the femto cell base station to the broadcast control apparatus based on a predetermined trigger.

The present invention provides a first femto cell base station used in a communication system comprising a broadcast control apparatus that performs broadcasting to an unspecified wireless terminal, the femto cell base station comprising: reception means for receiving a broadcast message from the broadcast control apparatus; comparison means for comparing registered location information registered in advance in the femto cell base station and registered location information included in the broadcast message; and distribution means for broadcasting the distribution content of the broadcast message to a wireless terminal that is wirelessly connected to the femto cell base station if the pieces of information coincide in the comparison by the comparison means.

The present invention provides a second femto cell base station used in a communication system comprising a broadcast control apparatus that performs broadcasting to an unspecified wireless terminal, the femto cell base station comprising: storage means for storing location information of the femto cell base station; and location information transmission means for transmitting a SIP (Session Initiation Protocol) message including the location information to the broadcast control apparatus based on a predetermined trigger.

The present invention provides a communication system that comprises the broadcast control apparatus, the call state control apparatus, and the femto cell base station and that performs broadcasting to an unspecified wireless terminal that is wirelessly connected to the femto cell base station.

The present invention provides a first communication control method in a communication system comprising a femto cell base station and a broadcast control apparatus that performs broadcasting to an unspecified wireless terminal that is wirelessly connected to the femto cell base station, the communication control method comprising: the broadcast control apparatus receiving location information of the femto cell base station; and the broadcast control apparatus updating an association of a database, in which the location information of the femto cell base station that is present in a predetermined distribution area section is associated with the distribution area section, based on the received location information of the femto cell base station.

The present invention provides a second communication control method in a communication system comprising a femto cell base station, a broadcast control apparatus, and a call state control apparatus, the communication control method comprising: the call state control apparatus receiving a SIP (Session Initiation Protocol) message including location information of the femto cell base station; and the call state control apparatus transmitting the SIP message including the location information of the femto cell base station to the broadcast control apparatus based on a predetermined trigger.

The present invention provides a third communication control method in a communication system comprising a femto cell base station and a broadcast control apparatus that performs broadcasting to an unspecified wireless terminal wirelessly connected to the femto cell base station, the communication control method comprising: the femto cell base station receiving a broadcast message from the broadcast control apparatus; the femto cell base station comparing registered location information registered in advance in the femto cell base station and registered location information included in the broadcast message; and the femto cell base station broadcasting the distribution content of the broadcast message to the wireless terminal that is wirelessly connected to the femto cell base station if the pieces of registered location information coincide.

The present invention provides a fourth communication control method in a communication system comprising a femto cell base station and a broadcast control apparatus that performs broadcasting to an unspecified wireless terminal that is wirelessly connected to the femto cell base station, wherein the femto cell base station transmits a SIP (Session Initiation Protocol) message including location information of the femto cell base station to the broadcast control apparatus based on a predetermined trigger.

The present invention provides a first program causing a broadcast control apparatus that is used in a communication system comprising a femto cell base station and that performs broadcasting to an unspecified wireless terminal that is wirelessly connected to the femto cell base station to execute: a procedure of the broadcast control apparatus receiving location information of the femto cell base station; and a procedure of the broadcast control apparatus updating an association of a database, in which the location information of the femto cell base station that is present in a predetermined distribution area section is associated with the distribution area section based on the received location information of the femto cell base station.

The present invention provides a second program causing a femto cell base station and a call state control apparatus that is used by being connected to a broadcast control apparatus to execute: a procedure of receiving a SIP (Session Initiation Protocol) message including location information of the femto cell base station; and a procedure of transmitting the SIP message including the location information of the femto cell base station to the broadcast control apparatus based on a predetermined trigger.

The present invention provides a third program causing a femto cell base station and a call state control apparatus that is used by being connected to a broadcast control apparatus to execute: a procedure of receiving a SIP (Session Initiation Protocol) message including location information of the femto cell base station; and a procedure of transmitting the SIP message including the location information of the femto cell base station to the broadcast control apparatus based on a predetermined trigger.

The present invention provides a fourth program causing a femto cell base station used in a communication system comprising a broadcast control apparatus that performs broadcasting to an unspecified wireless terminal to execute: a procedure of receiving a broadcast message from the broadcast control apparatus; a procedure of comparing registered location information registered in advance in the femto cell base station and registered location information included in the broadcast message; and a procedure of broadcasting the distribution content of the broadcast message to the wireless terminal that is wirelessly connected to the femto cell base station if the pieces of registered location information coincide.

The present invention provides a fifth program causing a femto cell base station that is used in a communication system comprising a broadcast control apparatus that performs broadcasting to an unspecified wireless terminal to execute a procedure of transmitting a SIP (Session Initiation Protocol) message including location information of the femto cell base station to the broadcast control apparatus based on a predetermined trigger.

Advantageous Effects of Invention

According to the present invention, broadcasting to a predetermined distribution area is possible in a communication system using a femto cell base station, as in an existing public mobile communication network.

BRIEF DESCRIPTION OF DRAWINGS

FIG. 4 is a diagram showing a summary of area management by the comparison with the existing 3G network according to the exemplary embodiment.

FIG. 5 is a diagram showing an example of the format of SAI.

FIG. 6 is a diagram showing an example of the format of GEOarea.

FIG. 7 is a diagram showing an example of an operation pattern for registering location information of Femto AP and the like in CBC/AS 96.

FIG. 8 is a diagram showing an example of the configuration pattern in Cases #1 to #3 of FIG. 7.

FIG. 15 is a sequence diagram showing an example of an operation of CBC/AS 96 broadcasting a CBS message.

DESCRIPTION OF EMBODIMENTS

Exemplary embodiments applying a broadcast control apparatus, a call state control apparatus, a femto cell base station, a communication system, a method, and a program according to the present invention will be described in detail with reference to the drawings.

Figure 1:
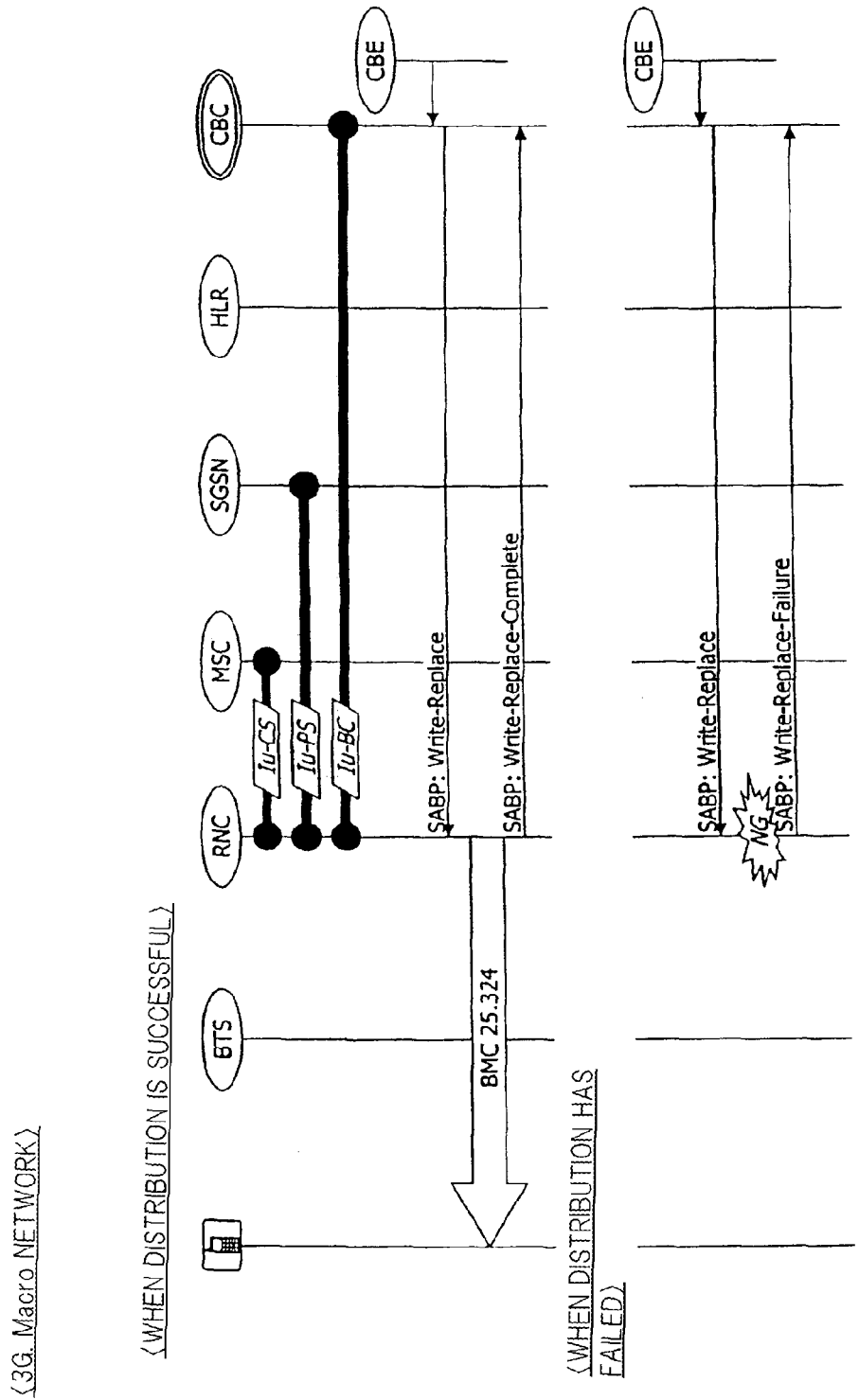
FIG. 1 is a sequence diagram showing an example of the distribution operation of a CBS message in an existing 3G network.
Figure 2:
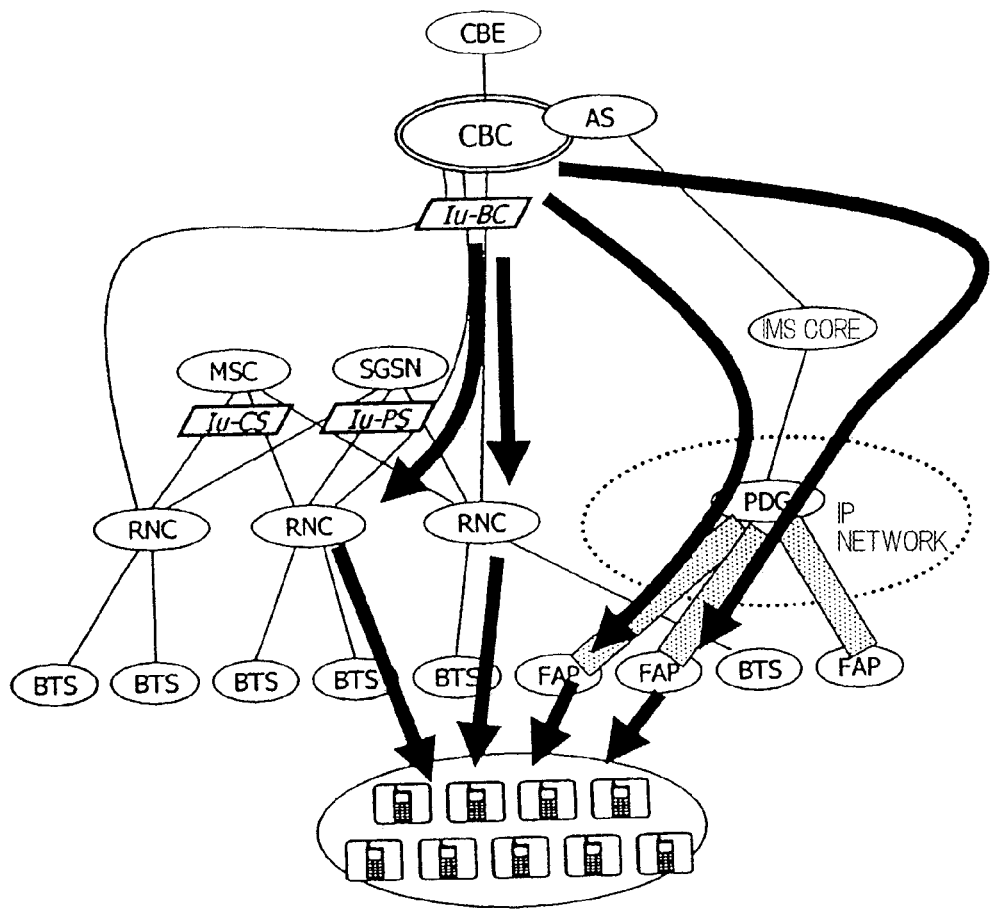
FIG. 2 is a diagram conceptually showing the operation of a communication system of an exemplary embodiment.

A summary of the communication system as an exemplary embodiment will be described first with reference to FIG. 2.

An object of a Femto IMS (IP Multimedia subsystem) network according to the exemplary embodiment is to perform broadcasting of a CBS message without departing from a standard, such as 3GPP (3rd Generation Partnership Project), while a femto cell base station (Femto AP; Femto Access Point) connects a call of UE that is a wireless terminal.

To attain the object, AS (application server) with a function of managing the distribution area of each Femto AP is arranged on CBC in the exemplary embodiment to distribute the CBS message through the Femto IMS network. Therefore, the CBS message distributed from CBC is distributed to Femto AP in a designated area that is designated as the destination through an apparatus such as CSCF that constitutes a core network of the Femto IMS network. The CBS message is then distributed to UE existing under the control of Femto AP.

In this way, if an instruction to distribute the CBS message is transmitted from CBE, such as a server managed by Meteorological Agency, municipalities, and the like, to CBC, the CBS message is broadcasted to UE included in the existing 3G network and to UE included in the Femto IMS network of the exemplary embodiment.

The communication system as an exemplary embodiment will be described in detail.

Figure 3:
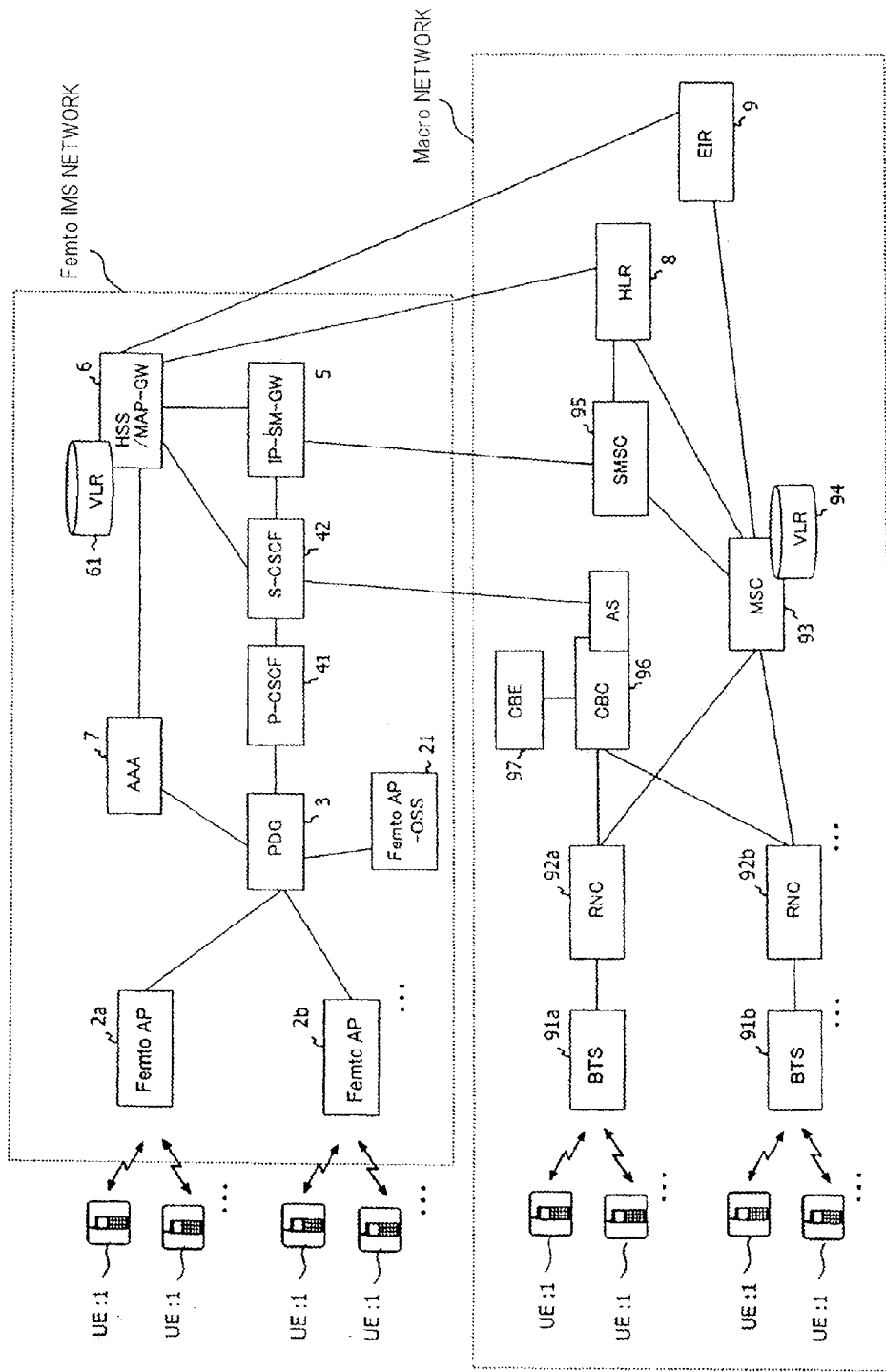
FIG. 3 is a block diagram showing an example of the configuration of the communication system as the exemplary embodiment.

FIG. 3 is a block diagram showing an example of a configuration of the communication system as the exemplary embodiment. As shown in FIG. 3, the communication system of the exemplary embodiment includes a Macro network and a Femto IMS network.

The Macro network is an existing 3G network. The Macro network comprises UE (User Equipment) 1, BTS 91, RNC 92, MSC (Mobile Services Switching Centre) 93, VLR (Visitor Location Register) 94, SMSC (Short Message Service Center) 95, CBC 96, HLR (Home Location Register) 8, and EIR (Equipment Identify Register) 9.

CBC 96 is connected to CBE 97 that is a server managed by the Meteorological Agency, municipalities, and the like. AS with a function of managing the distribution area of each Femto AP in the Femto IMS network is connected to CBC 96. AS may be arranged in CBC 96, may be realized by software of CBC 96, or may be arranged as an apparatus in a package separate from CBC 96. CBC 96 and AS are connected to each other to function as a broadcast control apparatus that controls distribution of the CBS message.

UE 1, BTS 91, RNC 92, MSC 93, VLR 94, SMSC 95, CBC 96, HLR 8, and EIR 9 forming the Macro network are apparatuses that execute processes that are compliant with an existing standard, such as 3GPP, and specific processes executed by the apparatuses will not be described. The technique used in the existing Macro network is disclosed, for example, in 3GPP TS 33.234 V8.0.0 (2007-12).

In the Femto IMS network, Femto AP 2 that establishes a predetermined communication area, Femto AP-OSS (Operation Support System) 21, and PDG (Packet Data Gateway) 3 that connects each Femto AP 2 through the network are connected to the core network. The core network comprises P-CSCF (Proxy-Call Session Control Function) 41, S-CSCF (Serving-Call Session Control Function) 42, IP Short Message Gateway (IP-SM-GW) 5, and HSS/MAPGW (Home Subscriber Server/Mobile Application Part Gateway) 6.

Femto AP 2 is a compact wireless base station that covers a narrow communication area of about several dozen meters in radius. Femto AP-OSS 21 is an apparatus that sets and monitors Femto AP 2 through the network.

PDG 3 is an apparatus that relays messages.

CSCF has functions of session control, management, authentication, routing, and the like using SIP (Session Initiation Protocol). P-CSCF 41 is CSCF that is in contact with a terminal, and S-CSCF 42 is CSCF as a center of the session control, which is an example of the call state control apparatus.

IP-SM-GW 5 performs distribution controls, such as controlling distribution control of a short message and controlling a supplementary service control.

HSS/MAPGW 6 includes VLR (Visitor Location Register) 61 and manages subscriber information of UE 1 connected to the Femto IMS network. HSS/MAPGW 6 acquires the subscriber information of UE 1 from HLR 8 and stores the acquired subscriber information of UE 1 in VLR 61 to manage the information.

HSS/MAPGW 6 includes an MAPGW function of connecting a line based on a protocol other than MAP, such as DIAMETER, and a line based on the protocol of MAP and of converting a signal based on the protocol other than MAP and a signal based on the protocol of MAP. In this way, HSS includes the MAPGW function in HSS/MAPGW 6.

AAA (Authentication Authorization Accounting) 7 executes an authentication process between UE 1 and the network.

EIR 9 receives, from an operator, an IMEI list of wireless terminals determined by the operator to be illicitly used and stores the IMI list. When a signal of Check IMEI (check request of IMEI) is received, EIR 9 checks whether received IMEI is included in the illicit IMEI list and returns the determination result.

A summary of the area management according to the exemplary embodiment will be described with reference to FIG. 4 and by comparison with the area management in the existing 3G network.

In general, CBC 96 stores area sections of "forecast areas" managed by CBE 97 installed in the Meteorological Agency or the like and administrative boundary information of the Geographical Survey Institute and the like. The administrative boundary information is information indicating boundaries of administrative districts and is information of area sections, such as boundaries of prefectures, branch boundaries of Hokkaido, ward boundaries of counties, cities, and Tokyo, and ward boundaries of towns, villages, and government designated cities.

In the distribution of the CBS message in the existing 3G network, when CBC 96 receives instructions to distribute the CBS message, such as an earthquake news flash, for a specific "forecast area" from CBE 97, the administrative boundary information corresponding to the received "forecast area" is determined, and the CBS message is distributed to RNC 92 included in the area section.

In this case, CBC 96 associates and stores the location information, the administrative boundary information, and the area sections of "forecast areas" acquired from an external database (base station management database) that manages the location information of each RNC to distribute the CBS message in the existing 3G network. The location information of each RNC acquired by CBC 96 from the external database includes LAC (Location Area Code), SAC (Service Area Code), cell ID, base station ID, latitude and longitude of installation location, IP address, and the like.

The installation location of RNC 92 is set by a communication carrier. Therefore, CBC 96 collects the location information of RNC from the external database at a predetermined frequency of about once a day based on FTP (File Transfer Protocol) or the like and updates the association of the location information, the administrative boundary information, and the area sections of "forecast areas" every time the information is collected.

However, Femto AP 2 is installed at a place near the user in the Femto IMS network according to the exemplary embodiment. Therefore, Femto AP 2 may be reactivated by the user, or the installation location may be moved a little.

The IP address of Femto AP 2 is newly allocated upon every reactivation. Therefore, the IP address is changed once the user reactivates Femto AP 2 when the location information is collected about once a day as in the existing 3G network, and the CBS message is not normally distributed in some cases.

Furthermore, there is no external database for managing the location information of each Femto AP in the Femto IMS network according to the exemplary embodiment. Therefore, the location information for distributing the CBS message needs to be collected from each Femto AP.

Therefore, in the Femto IMS network according to the exemplary embodiment, AS connected to CBC 96 collects the location information of Femto AP 2 upon the location registration operation from Femto AP 2 to the core network.

In the location information collection of Femto AP 2 according to the exemplary embodiment, the location information to be collected is stored from the core network of the Femto IMS network to SIP:Register (SIP request message of Register method), or so-called 3rd Party Register, addressed to an apparatus, which is CBC/AS 96, outside the Femto IMS network to transmit and receive the location information.

The location information to be collected, which is stored in a 3rd Party Register signal, includes SAI (Service Area Identification), GEOarea, and the IP address (Inner-IP) allocated to Femto AP 2. Another example of the information to be collected includes expiration date information of Register.

SAI (registered location information) is a value determined in advance by the operator of the system, and as illustrated in FIG. 5, SAI is defined as a format including parameters of MCC (Mobile Country Code), MNC (Mobile Network Code), LAC, and SAC.

Defined by a format as illustrated in FIG. 6, GEOarea shows location information including the latitude/longitude information of the source apparatus.

As the location information of Femto AP 2 is collected every time the location is registered, AS connected to CBC 96 uses the latitude/longitude information included in GEOarea to update the association of the administrative boundary information, the area sections of "forecast areas", and the location information of Femto AP 2 each time that the information is collected.

The operator of the system registers SAI (registered location information) and GEOarea in Femto AP 2 from Femto AP-OSS 21 upon the initial setting such as during the installation. Femto AP 2 stores the initial setting information in a storage (not shown). An LAC value in SAI can be determined from, for example, the installation location, and an SAC value may be uniquely provided for each Femto AP. GEOarea is determined by the installation location.

In this way, Femto AP-OSS 21 functions as ZMS (Zone Management System) that sets various pieces of location information to Femto AP 2.

When the location information of Femto AP 2 is registered in CBC/AS 96 upon the location registration of UE 1 to the core network, the identification information for identifying UE 1 is stored in a 3rd Party Register signal before transmission and is associated with the location information of Femto AP 2 before registration in CBC/AS 96. IMSI (International Mobile Subscriber Identity), MSISDN (Mobile Subscriber ISDN Number; phone number), or the like may be used as the identification information for identifying UE 1.

As CBC/AS 96 stores the identification information of UE 1 that is present under the control of Femto AP 2, the CBS message is not distributed to Femto AP 2 that does not wirelessly include UE 1, and the CBS message can be distributed only to Femto AP 2 that wirelessly includes UE 1. As a result, unnecessary traffic due to the distribution of the CBS message can be reduced.

A pattern of an operation of registering or deleting the location information of Femto AP and the like to and from CBC/AS 96 according to the exemplary embodiment will be described with reference to FIG. 7.

As described, when the location registration of the UE 1 to the core network is performed through Femto AP 2, CBC/AS 96 uses 3rd Party Register to collect the location information of Femto AP 2 and the identification information of UE 1. As illustrated in Cases #1 and #2 of FIG. 7, the location registration of UE 1 is performed upon the location registration update (ReRegister) performed by FAP (Femto AP) at a predetermined period by FAP (Femto AP) or when UE 1 moves to be under the control of another Femto AP.

In Case #1 of FIG. 7, in other words, in the case of the periodic location registration update by Femto AP 2, the location information of Femto AP 2 and the identification information of UE 1 do not change. Therefore, in CBC/AS 96, the registered location information does not change after the update.

In Case #2 of FIG. 7, in other words, when UE 1 moves to be under the control of another Femto AP, various pieces of location information, such as the IP address, SAI, and GEOarea, related to Femto AP 2 of the destination are newly registered in CBC/AS 96.

The location registration of Femto AP 2 is also performed in Case #3 of FIG. 7, in other words, when the reconnection to the core network is performed to reactivate Femto AP 2. In that case, the IP address allocated to Femto AP 2 is changed, and the location information is registered in CBC/AS 96. If there is UE 1 that is present under the control of Femto AP, the identification information of UE 1 is registered in CBC/AS 96.

In Case #4 of FIG. 7, in other words, when the power of UE is turned off (IMSI.detach), in Case #5 of FIG. 7, in other words, when UE moves from under the control of Femto AP to under the control of the Macro network, or in Case #6 of FIG. 7, in other words, when the contract of UE is canceled, SIP:NOTIFY is used from the core network of the Femto IMS network to transmit a deletion instruction to CBC/AS 96. As a result, the identification information of UE 1 is deleted from CBC/AS 96.

Cases #1 to #3 of FIG. 7, in other words, examples of configuration for realizing the operation of registering the location information of Femto AP and the like to CBC/AS 96 according to the exemplary embodiment will be described with reference to FIG. 8.

An example of configuration 1 of FIG. 8 can be a configuration in which S-CSCF 42 transmits 3rd Party Register storing the location information of Femto AP 2 and the identification information of UE 1 to CBC/AS 96 when the location is registered in the core network.

According to the configuration, S-CSCF 42 manages end-user information (UE.IMSI). Therefore, the configuration can be applied not only to CBS described in the exemplary embodiment, but also to existence/nonexistence management of UE 1 and various IMS supplementary services.

An example of configuration 2 of FIG. 8 can be a configuration in which Femto AP 2 transmits a 3rd Party Register storing the location information of Femto AP 2 and the identification information of UE 1 to CBC/AS 96 when the location is registered in the core network.

According to the configuration, Femto AP 2 manages the end-user information (UE.IMSI). Therefore, the configuration can be applied not only to CBS described in the exemplary embodiment, but also to the existence/nonexistence management of UE 1 and various IMS supplementary services.

An example of configuration 3 of FIG. 8 can be a configuration in which Femto AP 2 transmits a 3rd Party Register storing the location information of Femto AP 2 to CBC/AS 96 when an IP Sec (IP security protocol) tunnel is established by the activation of Femto AP 2.

According to the configuration, CBC/AS 96 may be configured not to manage the end-user information (UE.IMSI). Therefore, the configuration can be applied not only to an IMS system, but also to an RAN (Radio Access Network)-GW system.

An example of the operation of configuration 1 of FIG. 8 in Cases #1 to #3 of FIG. 7, in other words, an example of operation in which when the location is registered in the core network, 3rd Party Register from S-CSCF 42 is used, and an example of when the location information of Femto AP 2 and the identification information of UE 1 are registered in CBC/AS 96 will be described with reference to the sequence diagram of FIG. 9.

In the example of operation shown in FIG. 9, an example of the initial location registration when UE 1 enters the communication area of AP 2 will be described. A case in which IMEI of UE 1 is not illicit and a message indicating the legitimacy is returned as a normal response as a result of the transmission of a check request of IMEI to EIR 9 will be illustrated.

UE 1 is unusable when the location registration is not completed normally or when IMEI is determined to be illicit as a result of checking IMEI, and location information registration to CBC according to the example of operation is not performed.

The communication system of the exemplary embodiment comprises a plurality of Femto APs 2, and UE 1 can move between the Femto APs. Therefore, Femto AP 2 manages the subscriber information (CS/PS) of UE 1 under the control of Femto AP 2. CS denotes Circuit Switching, and PS denotes Packet Switching.

The management of the subscriber information (CS/PS) of UE 1 by Femto AP 2 is realized by UE 1 sequentially executing a location registration process of CS and a location registration process of PS with the core network through Femto AP 2.

In the location registration of CS of the example of operation, Femto AP 2 adds IMEISV (IMEI Software Version number) of UE 1 to a request message in a MESSAGE method of SIP to transmit IMEISV to IPSMGW 5 when a transaction of registering the location information of UE 1 in the core network, such as VLR 61 is completed. EIR 9 uses IMEISV to check IMEI, and it is determined that IMEI is not an illicit terminal. When the location registration of UE 1 is completed, S-CSCF 42 transmits the 3rd Party Register signal including the location information of Femto AP 2 and the identification information of UE 1 to CBC/AS 96.

When UE 1 newly attempts to be under the control of Femto AP 2, UE 1 starts the location registration of a CS service (initial location registration). Specifically, when UE 1 first connects to Femto AP 2 by wireless communication (step A1), UE 1 transmits Location Update Request to Femto AP 2 (step A2).

When Location Update Request is received, Femto AP 2 transmits ID-Request related to IMSI to UE 1. Subsequently, when Femto AP 2 receives ID-Response including IMSI from UE 1 (step A3), Femto AP 2 transmits ID-Request related to IMEISV to UE 1. Subsequently, UE 1 returns ID-Response including IMEISV to Femto AP 2 (step A4).

When ID-Response is received, Femto AP 2 establishes IKE SA (Internet Key Exchange-Security Authentication) with PDG 3 (step A5) and adds APN (Access Point Name) and NAI (Network Access Identifier) to IKE-AUTH Request before transmission to PDG 3. IKE-AUTH denotes Internet Key Exchange-AUTHentication. APN is information for identifying a connection point of the network. NAI is information for identifying an access of the network.

Since Location Update Request is received from UE 1, Femto AP 2 determines that the request is for the location registration of the CS service and transmits NAI of "0CS0<UE_IMSI>/<Femto_IMSI>@realmname" to PDG 3. The information "OCSO" denotes the location registration of the CS service. The information "<UE_IMSI>" is for identifying UE and is IMSI.UE included in ID-Response received from UE 1. The information "<Femto_IMSI>" is for identifying Femto AP 2.

When IKE-AUTH Request is received, PDG 3 transmits Dia-EAP-Request to AAA 7 (step A6). Dia-EAP denotes Diameter-Extensible Authentication Protocol.

When Dia-EAP-Request is received, AAA 7 determines that the request is for the location registration of the CS service based on NAI included in Dia-EAP-Request. Therefore, AAA 7 adds IMSI.UE to Dia-Wx-MAR before transmission to HSS/MAPGW 6 (step A7). Dia-Wx-MAR denotes Diameter-Wx-Multimedia Authentication Request.

When Dia-Wx-MAR is received, HSS/MAPGW 6 transmits MAP-SAI invocation[CS] to HLR 8 (step A8). MAP-SAI denotes MAP-Send Authentication Information. The information [CS] denotes Circuit Switching. HSS/MAPGW 6 adds IMSI.UE included in Dia-Wx-MAR to MAP-SAI invocation[CS] before transmission.

When MAP-SAI invocation[CS] is received, HLR 8 transmits MAP-SAI Ack to HSS/MAPGW 6 (step A9). In this case, HLR 8 acquires RAND/AUTN/CK/IK/XRES corresponding to IMSI.UE included in MAP-SAI invocation[CS] and adds the acquired RAND/AUTN/CK/IK/XRES to MAP-SAI Ack before transmission.

RAND/AUTN/CK/IK/XRES is information compliant with 3GPP. Rand denotes Random challenge. AUTN denotes Authentication Token. CK denotes Cipher Key, IK denotes Integrity Key. XRES denotes Expected RESponse.

In the example of operation, HLR 8 adds RAND/AUTN/CK/IK/XRES to MAP-SAI Ack before transmission (EAP-AKA authentication). However, HLR 8 may add RAND/AUTN/KC/RES to MAP-SAI Ack before transmission (EAP-SIM authentication). HLR 8 selects EAP-AKA authentication (UMTS (Universal Mobile Telecommunications System) authentication) and EAP-SIM authentication (GSM (Global System for Mobile Communications) authentication) based on the capability of NW signed by the subscriber of UE 1.

When MAP-SAI Ack is received, HSS/MAPGW 6 transmits Dia-Wx-MAA to AAA 7 (step S10). In this case, HSS/MAPGW 6 adds RAND/AUTN/CK/IK/XRES included in MAP-SAI Ack to Dia-Wx-MAA before transmission. Dia-Wx-MAA denotes Diameter-Wx-Multimedia Authentication Answer.

When Dia-Wx-MAA is received, AAA 7 transmits Dia-EAP-Answer to PDG 3. In this case, AAA 7 adds RAND/AUTN/CK/IK included in Dia-Wx-MAA to Dia-EAP-Answer before transmission.

When Dia-EAP-Answer is received, PDG 3 transmits IKE-AUTH Response to Femto AP 2 (step A11). In this case, PDG 3 adds EAP-Request/AKA-Challenge and RAND/AUTN/CK/IK included in Dia-EAP-Answer to IKE-AUTH Response before transmission. AKA denotes Authentication and Key Agreement.

When IKE-AUTH Response is received, Femto AP 2 transmits Authentication Request to UE 1 (step A12). In this case, Femto AP 2 adds RAND/AUTN included in IKE-AUTH Response to Authentication Request before transmission.

When Authentication Request is received, UE 1 performs authentication calculation based on RAND/AUTN included in Authentication Request. The authentication calculation is performed by a method compliant with 3GPP.

UE 1 calculates RES and adds the calculated RES to Authentication Response before transmission to Femto AP 2 (step A13). The calculation of RES is performed by a method compliant with 3GPP.

When Authentication Response is received, Femto AP 2 transmits IKE-AUTH Request to PDG 3. In this case, Femto AP 2 adds EAP-Response/AKA-Challenge and RES included in Authentication Response to IKE-AUTH Request before transmission.

When IKE-AUTH Request is received, PDG 3 transmits Dia-EAP-Request to AAA 7 (step A14). In this case, PDG 3 calculates MAC (Message Authentication Code) and adds RES and MAC to Dia-EAP-Request before transmission. MAC is calculated by a method compliant with 3GPP.

When Dia-EAP-Request is received, AAA 7 performs UE authentication. The UE authentication is performed by a method compliant with 3GPP. If the UE authentication is successful, AAA 7 transmits Dia-EAP-Answer to PDG 3. In this case, AAA 7 adds EAP-Success to Dia-EAP-Answer before transmission.

When Dia-EAP-Answer is received, PDG 3 transmits IKE-AUTH Response to Femto AP 2 (step S15). In this case, PDG 3 adds EAP-Success to IKE-AUTH Response before transmission.

When the transaction of the authentication in steps AS to A15 is completed, the communication between Femto AP 2 and UE 1 is executed in a concealment process that is compliant with 3GPP using Security Mode Command.

Femto AP 2 transmits SIP:Register, in which Message Type is Register, to P-CSCF 41 (step A17). In this case, Femto AP 2 adds the location information of Femto AP 2, such as SAI set in advance by Femto AP-OSS 21, GEOarea, and the allocated IP address (Inner-IP), the expiration date information of Register, and the identification information of UE 1, such as IMSI.UE and MSISDN.UE, to SIP:Register before transmission to P-CSCF 41.

When SIP:Register is received, P-CSCF 41 determines that SIP:Register that is Call ID of the subscriber information (Register information of Femto AP 2) of new UE 1 is received. In this case, P-CSCF 41 determines that the reception indicates new location registration of UE 1 due to a movement from the Macro network to Femto AP or power ON and transmits Dia-Cx-UAR to HSS/MAPGW 6 (step A18).

When Dia-Cx-UAR is received, HSS/MAPGW 6 transmits Dia-Cx-UAA to P-CSCF 41 (step A19). When Dia-Cx-UAA is received, P-CSCF 41 adds the location information of Femto AP 2, such as SAI received from Femto AP 2, GEOarea, the allocated IP address (Inner-IP), the expiration date information of Register, and the identification information of UE 1, such as IMSI.UE and MSISDN.UE, to SIP:Register before transmission to S-CSCF 42 (step A20).

Like P-CSCF 41, S-CSCF 42 determines that the reception indicates new location registration of UE 1 when SIP:Register is received and transmits Dia-Cx-SAR to HSS/MAPGW 6. SAR denotes Server-Assignment-Request. S-CSCF 42 adds IMSI.UE to Dia-Cx-SAR before transmission (step A21).

When Dia-Cx-SAR is received, HSS/MAPGW 6 transmits a MAP-Update Location invocation [CS] to HLR 8 (step A22). In this case, HSS/MAPGW 6 adds IMSI.UE to the MAP-Update Location invocation before transmission.

When the MAP-Update Location invocation is received, HLR 8 registers the subscriber information of UE 1 by a method that is compliant with 3GPP (step A29) and transmits the MAP-Insert Subscriber Data invocation to HSS/MAPGW 6 (step A23). In this case, HLR 8 adds the subscriber information to the MAP-Insert Subscriber Data invocation before transmission.

When the MAP-Insert Subscriber Data invocation is received, HSS/MAPGW 6 creates subscriber information of UE 1 based on the subscriber information included in the MAP-Insert Subscriber Data invocation. HSS/MAPGW 6 registers the subscriber information of UE 1 to VLR 61 and uses VLR 61 to manage the subscriber information (CS) of UE 1. More specifically, HSS/MAPGW 6 associates the subscriber information (CS) of UE 1 with the information of Femto AP 2 before registration in VLR 61 (step A30).

HSS/MAPGW 6 then transmits MAP-Insert Subscriber Data Ack to HLR 8 (step A24).

When MAP-Insert Subscriber Data Ack is received, HLR 8 transmits MAP-Update Location Ack to HSS/MAPGW 6 (step A25).

When MAP-Update Location Ack is received, HSS/MAPGW 6 transmits Dia-Cx-SAA to S-CSCF 42 (step A26). SAA denotes Server-Assignment-Answer. HSS/MAPGW 6 adds MSISDN to Dia-Cx-SAA before transmission.

When Dia-Cx-SAA is received, S-CSCF 42 transmits SIP-200 OK including MSISDN to Femto AP 2 through P-CSCF 41 (step A27). S-CSCF 42 associates the information of SIP: Register received from Femto AP 2 with the subscriber information (CS) of UE 1 to manage the information. In this way, S-CSCF 42 associates the subscriber information (CS) of UE 1 with Femto AP 2 to manage the information (step A31).

HSS/MAPGW 6 performs transmission and reception similar to the signal transmission and reception in steps A22 to A25 for PS in GPRS (General Packet Radio Services) (step A28).

When the transaction of registering the location information (CS) of UE 1 in the core network in steps A11 to A27 is completed, Femto AP 2 generates a SIP message of Check IMEI including IMEISV and uses a MESSAGE method for transmission to IPSMGW 5 (step A32).

When the SIP message is received from Femto AP 2, IPSMGW 5 determines that the destination of the received content to be transmitted as a message is HSS/MAPGW 6, not SMSC 95 in the case of a short message, because the value of Content-Type is "application/vnd.3gpp.adtap" indicating Check IMEI and SS control. Therefore, IPSMGW 5 maps the received content to a message of a predetermined IP-based protocol, such as DIAMETER, and transmits the mapped message to HSS/MAPGW 6 (step A33).

IPSMGW 5 returns the SIP message of 202 Accept to Femto AP 2 (step A34).

When the Check IMEI information is received from IPSMGW 5, HSS/MAPGW 6 determines that the destination of the message is EIR 9 based on the MAPGW function, because Protocol Discriminator of the received message indicates Check IMEI. HSS/MAPGW 6 adds received IMEISV to Check IMEI-inv that is a message of a method corresponding to the received content, or Check IMEI, before transmission to EIR 9 (step A35).

When the Check IMEI information including IMEISV is received, EIR 9 compares IMEI delivered from IMEISV with the illicit IMEI list stored in the apparatus. If IMEI delivered from the received Check IMEI information is not included in the illicit IMEI list, Check IMEI-ack indicating "White Listed" is transmitted to HSS/MAPGW 6 (step A36).

If EIR 9 includes an IMEI list indicating Gray List, and IMEI delivered from the received Check IMEI information is included in the IMEI list indicating Gray List, Check IMEI-ack indicating "Gray Listed" is transmitted to HSS/MAPGW 6.

When Check IMEI-ack is received from EIR 9, HSS/MAPGW 6 maps the received content to the message of the protocol, such as DIAMETER, based on the MAPGW function and transmits the converted message of the protocol to IPSMGW 5 (step A37).

When Dia-Check IMEI-ack is received from HSS/MAPGW 6, IPSMGW 5 maps the received content to the SIP message and transmits a Check IMEI Response message of the converted MESSAGE method to Femto AP 2 (step A38).

When the Check IMEI Response message of the MESSAGE method is received from IPSMGW 5, Femto AP 2 returns the SIP message of 200 OK to IPSMGW 5 (step A39).

Femto AP 2 acquires TMSI (Temporary Mobile Subscriber Identifies) by a method compliant with 3GPP and adds acquired TMSI to Location Update Accept by a concealment process of Security Mode Command before transmission to UE 1 (step A40).

When Location Update Accept is received, UE 1 acquires TMSI generated by Femto AP 2 and transmits TMSI Reallocation Complete to Femto AP 2.

When TMSI Reallocation Complete is received, Femto AP 2 relates and manages IMSI.UE of UE 1 and TMSI. In this way, Femto AP 2 manages the subscriber information (CS) of UE 1 (step A42).

Subsequently, when a location registration process of PS is executed, Femto AP 2 ends the line connection with UE 1 (step A41).

S-CSCF 42 relays communication between Femto AP 2 and IPSMGW 5 and relays the SIP message of 200 OK from Femto AP 2 to IPSMGW 5 in step A39 to recognize that the location registration of UE 1 is normally performed.

When the sequence for the location registration of UE 1 is completed for a signal relayed by S-CSCF 42, S-CSCF 42 transmits SIP:Register to CBC/AS 96. S-CSCF 42 adds the location information of Femto AP 2, such as SAI of Femto AP 2 received from P-CSCF 41, GEOarea, and the allocated IP address (Inner-IP), the expiration date information of Register, and the identification information of UE 1, such as IMSI.UE and MSISDN.UE, to SIP:Register before transmission (step A43).

SIP:Register of step A43 is a SIP:Register signal, or so-called 3rd Party Register signal, that is transmitted from S-CSCF 42 forming the core network of the Femto IMS network to an apparatus outside the Femto IMS network, which is CBC/AS 96.

When SIP:Register from S-CSCF 42 is received, CBC/AS 96 returns the SIP message of 200 OK to S-CSCF 42 (step A44) and transmits an event notification request of SIP:SUBSCRIBE (step A45).

When SIP:SUBSCRIBE is received, S-CSCF 42 returns the SIP message of 200 OK (step A46).

When the SIP message of 200 OK from S-CSCF 42 is received, CBC/AS 96 transmits an event notification of SIP: NOTIFY to S-CSCF 42 (step A47).

When SIP:NOTIFY is received, S-CSCF 42 returns the SIP message of 200 OK (step A48).

In this way, CBC/AS 96 uses 3rd Party Register to receive the identification information of Femto AP 2, such as SAI of Femto AP 2, GEOarea, and the allocated IP address (Inner-IP), the expiration date information of Register, and the identification information of UE 1, such as IMSI.UE and MSIS-DN.UE. CBC/AS 96 then updates the association of the location information of Femto AP 2, the administrative boundary information, and the area sections of "forecast areas" and stores the association in the storage (not shown). CBC/AS 96 also relates the identification information of UE 1 to be under the control of Femto AP 2 and stores the information in the storage (not shown).

Although the initial location registration of UE 1 has been described, CBC/AS 96 similarly collects and remaps the location information of Femto AP 2 and the identification information of UE 1 and stores the information in the memory in Cases #1 to #3 of FIG. 7, in other words, when the location is registered in the core network.

An operation of the example of configuration 2 of FIG. 8 in Cases #1 to #3 of FIG. 7, in other words, an example of operation of using 3rd Party RegistEr from Femto AP 2 to register the location information of Femto AP 2 and the identification information of UE 1 in CBC/AS 96 when the location is registered in the core network, will be described with reference to the sequence diagram of FIG. 10.

Figure 9:
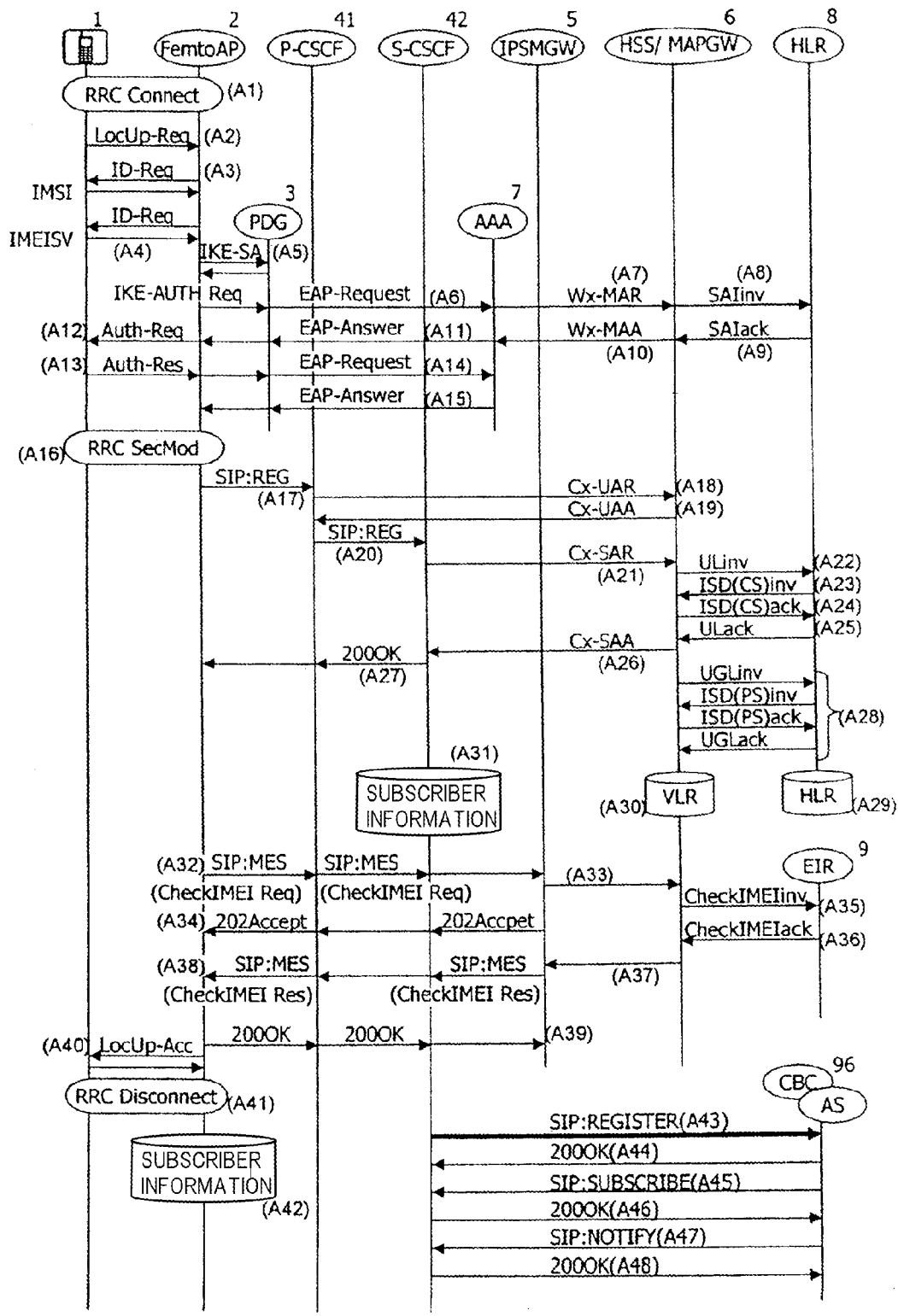
FIG. 9 is a sequence diagram showing an example of an operation of registering location information of Femto AP 2 and the like in the initial location registration of UE.
Figure 10:
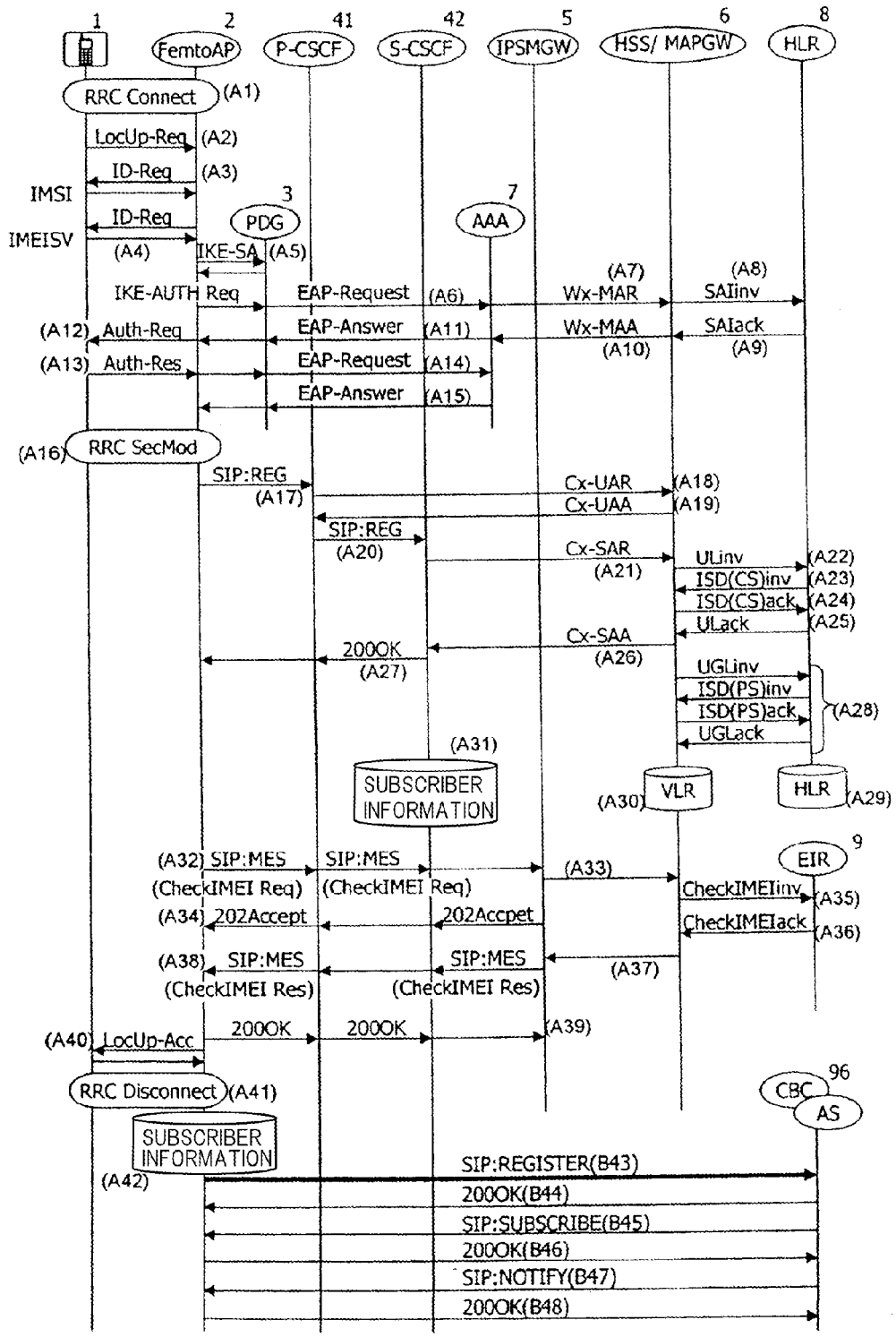
FIG. 10 is a sequence diagram showing another example of the operation of registering location information of Femto AP 2 and the like in the initial location registration of UE.

The example of operation shown in FIG. 10 illustrates a case in which the initial location registration of UE 1 is normally completed by the operation as in steps A1 to A42 of the example of operation shown in FIG. 9, and a message indicating illicitness is returned as a normal response in response to the check request of IMEI.

If the location registration is not normally completed, or illicitness is determined by checking IMEI, UE 1 becomes unusable as in the example of operation shown in FIG. 9, and the location information is not registered in CBC.

When Femto AP 2 relates and manages IMSI.UE of UE 1 and TMSI by the operation up to step S42, and the initial location of UE 1 is normally registered, Femto AP 2 ends the line connection with UE 1 (step A41). When IMSI.UE and TMSI are stored as the subscriber information of UE 1, Femto AP 2 transmits SIP:Register to CBC/AS 96. Femto AP 2 adds the location information, such as SAI of Femto AP 2, GEOarea, and the allocated IP address (Inner-IP), the expiration date information of Register, and the identification information of UE 1, such as IMSI.UE and MSISDN.UE, to SIP:Register before transmission (step B43).

When SIP:Register from Femto AP 2, or so-called 3rd Party Register signal, is received, CBC/AS 96 returns a SIP message of 200 OK to Femto AP 2 (step B44) and transmits an event notification request of SIP:SUBSCRIBE to Femto AP 2 (step B45).

When SIP:SUBSCRIBE is received, Femto AP 2 returns the SIP message of 200 OK (step B46).

When the SIP message of 200 OK is received from Femto AP 2, CBC/AS 96 transmits an event notification of SIP: NOTIFY to Femto AP 2 (step B47).

When SIP:NOTIFY is received, Femto AP 2 returns the SIP message of 200 OK (step B48).

CBC/AS 96 uses 3rd Party Register to receive the identification information of Femto AP 2, such as SAI of Femto AP 2, GEOarea, and the allocated IP address (Inner-IP), the expiration date information of Register, and the identification information of UE 1, such as IMSI.UE and MSISDN.UE. CBC/AS 96 updates the association of the location information of Femto AP 2, the administrative boundary information, and the area sections of "forecast areas" and stores the association in the memory (not shown). CBC/AS 96 relates the identification information of UE 1 to be under the control of Femto AP 2 and stores the information in the memory (not shown).

Although the initial location registration of UE 1 has been described, CBC/AS 96 collects and remaps the location information of Femto AP 2 and the identification information of UE 1 as in the example of operation shown in FIG. 8 and stores the information in memory in Cases #1 to #3 of FIG. 6, in other words, when the location is registered in the core network.

The example of configuration 3 of FIG. 8 in Cases #1 to #3 of FIG. 7, in other words, an example of operation when the location information of Femto AP 2 is registered in CBC/AS 96 based on 3rd Party Register from Femto AP 2 upon the activation of Femto AP 2 will be described with reference to the sequence diagram of FIG. 11.

Figure 11:
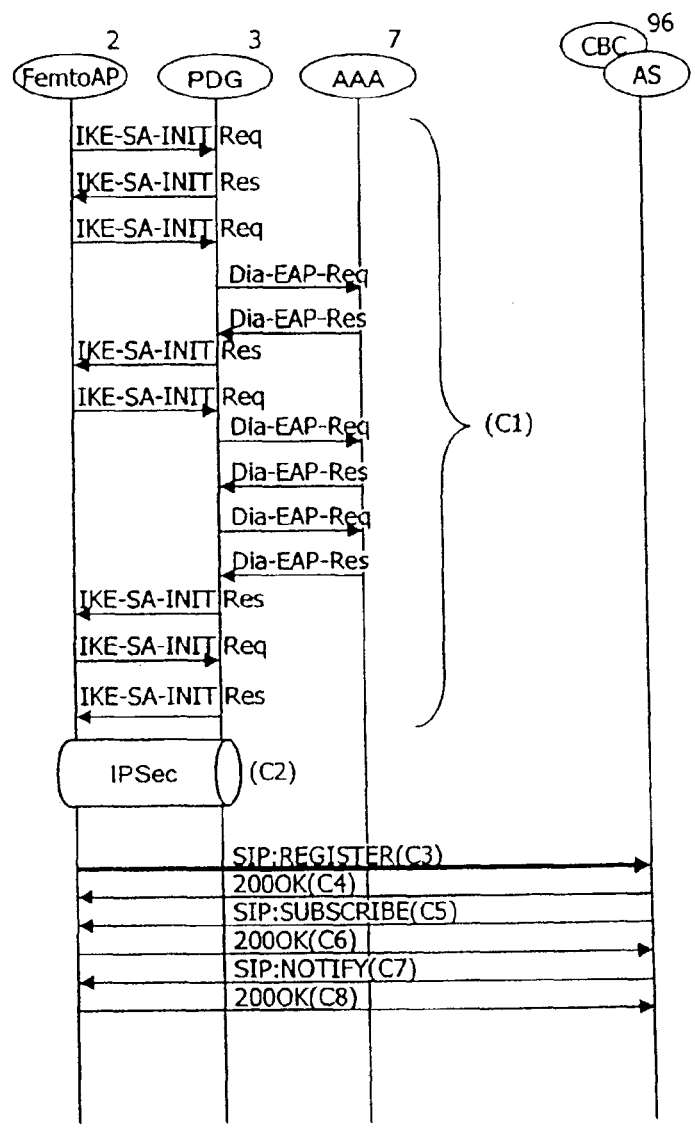
FIG. 11 is a sequence diagram showing an example of the operation of registering the location information of Femto AP 2 and the like upon the activation of Femto AP.

In the example of operation shown in FIG. 11, an authentication process of Femto AP 2 is executed by predetermined transmission and reception upon the activation of Femto AP 2 (step C1), a base tunnel by IP Sec is established between Femto AP 2 and PDG 3 (step C2). The operation of steps C1 and C2 is a process that is compliant with a standard of 3GPP and the like, and the details will not be described.

When the base tunnel by IP Sec is established, Femto AP 2 transmits SIP:Register to CBC/AS 96. Femto AP 2 adds the location information, such as SAI of Femto AP 2, GEOarea, the allocated IP address (Inner-IP), and IMSI.FAP, to SIP: Register before transmission (step C3).

When SIP:Register from Femto AP 2, or so-called 3rd Party Register signal, is received, CBC/AS 96 returns a SIP message of 200 OK to Femto AP 2 (step C4) and transmits an event notification request of SIP:SUBSCRIBE to Femto AP 2 (step C5).

When SIP:SUBSCRIBE is received, Femto AP 2 returns the SIP message of 200 OK (step C6).

When the SIP message of 200 OK from Femto AP 2 is received, CBC/AS 96 transmits an event notification of SIP: NOTIFY to Femto AP 2 (step C7).

When SIP:NOTIFY is received, Femto AP 2 returns the SIP message of 200 OK (step C8).

CBC/AS 96 uses 3rd Party Register to receive the location information, such as SAI of Femto AP 2, GEOarea, the allocated IP address (Inner-IP), and IMSI.FAP. CBC/AS 96 updates the association of the location information of Femto AP 2, the administrative boundary information, and the area sections of "forecast areas" and stores the association in the storage (not shown).

An example of operation of Case #4 of FIG. 7, in other words, when the power of UE is turned off (IMSI.detach) will be described with reference to the sequence diagram of FIG. 12.

When the power of UE 1 is turned off, UE 1 transmits MM:detach-Indication to Femto AP 2 (step D1). When detach-Indication is received, Femto AP 2 transmits SIP-De-Register, in which Message Type is De-Register, to S-CSCF 42 (step D2). In this case, Femto AP 2 adds IMSI.UE to SIP-De-Register before transmission to S-CSCF 42.

When SIP-De-Register is received, S-CSCF 42 determines that the registered subscriber information related to UE 1 (Register information of Femto AP 2) is deleted and transmits Dia-Cx-SAR including information indicating the location information deletion to HSS/MAPGW 6 (step D3).

When Dia-Cx-SAR including the information indicating the location information deletion is received, HSS/MAPGW 6 transmits Purge MS to HLR 8. When Purge MS is received, HLR 8 deletes the location registration information of UE 1 (step D7) and transmits Purge MS-ack to HSS/MAPGW 6.

When Purge MS-ack is received, HSS/MAPGW 6 deletes the location registration information of UE 1 in VLR 61 (step D8).

HSS/MAPGW 6 similarly transmits and receives Purge MS to and from HLR 9 for PS (step D4).

HSS/MAPGW 6 transmits Dia-Cx-SAA including the information of the location information deletion to S-CSCF 42 (step D5).

When Dia-Cx-SAA including the information of the location information deletion is received, S-CSCF 42 deletes the subscriber information of UE 1 (step D9) and transmits SIP-200 OK to Femto AP 2 (step D6).

S-CSCF 42 notifies CBC/AS 96 of the subscriber information deletion through SIP:NOTIFY (step D10). CBC/AS 96 deletes the notified identification information of UE 1 and transmits SIP-200 OK to S-CSCF 42 (step D11).

An operation when the identification information of UE 1 is deleted from the database in CBC/AS 96, as described above, will be described with reference to an example of summary of FIG. 12.

Figures 12, 13:
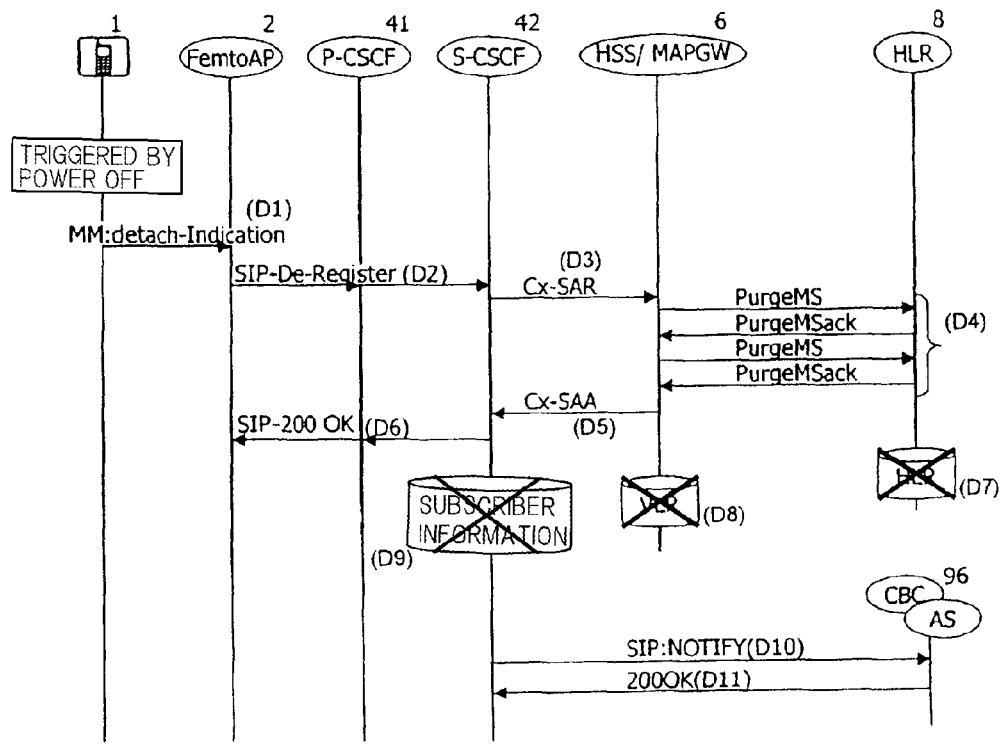
FIG. 12 is a sequence diagram showing an example of operation when the power of UE is turned off (IMSI.detach).
FIG. 13 is a diagram for explaining a database structure of CBC/AS 96.

In the example of FIG. 13, IMSI and MSISDN that are identification information related to UE of user A are indicated by A, and GEOarea, SAI, and IP address that are location information related to Femto AP 2a (FAP_a) are indicated by FAP_a.

As described, CBC/AS 96 associates the location information of Femto AP 2 and the identification information of UE 1 under the control of Femto AP 2 with the administrative boundary information and the area sections of "forecast areas" and stores the information as a database.

As CBC/AS 96 comprises the database, the location information of Femto AP 2 can be used to broadcast the CBS message. As the identification information of UE 1 under the control of Femto AP 2 is stored, it can be designed not to distribute the CBS message to Femto AP 2 in which UE 1 is not under the control.

In the example of database of FIG. 13, the following conditions will be described as an example.

UE_A, B, C, and D exist under the control of Femto AP 2a (FAP_a),

UE_E, F, G, and H exist under the control of Femto AP 2b (FAP_b), and the location information of Femto AP 2 and the identification information of UE 1 are registered in 3rd Party REGISTER.

If the power of UE_A is turned off (IMSI.detach) under these conditions, the line of UE_A is deleted from the database of CBC/AS 96 shown in FIG. 13.

However, since the lines of UE_B, C, and D remain in the database of CBC/AS 96, the location information of FAP_a also remains in the database of CBC/AS 96. Therefore, when CBC/AS 96 distributes the CBS message, the CBS message is also distributed to FAP_a, and the CBS message is distributed to UE_B, C, and D under the control of FAP_a.

If the power of UE_B, C, and D is turned off (IMSI.detach), the lines of UE_B, C, and D are deleted from the database of CBC/AS 96 shown in FIG. 13, and the location information of FAP_a is erased. Therefore, when CBC/AS 96 distributes the CBS message, the CBS message is not distributed to FAP_a.

Case #5 of FIG. 7, in other words, an example of operation when UE 1 moves from under the control of Femto AP to the Macro network, will be described with reference to the sequence diagram of FIG. 14.

When UE 1 moves to the Macro network, UE 1 transmits Location Update Request to MSC 93 through BTS 91 of the Macro network of the destination (step E1). When Location Update Request is received, MSC 93 transmits MAP Update Location to HLR 8 (step E2).

When MAP Update Location is received, HLR 8 transmits a MAP-Cancel Location invocation to HSS/MAPGW 6 (step E3). When the MAP-Cancel Location invocation is received, HSS/MAPGW 6 returns a MAP-Cancel Location ack to HLR 8 (step E4) and transmits Dia-Cx-RTR (Registration-Termination-Request) to S-CSCF 42 (step E5).

When Dia-Cx-RTR is received, S-CSCF 42 transmits SIP:NOTIFY indicating deletion of the subscriber information to Femto AP 2 (step E6).

When SIP-NOTIFY is received, Femto AP 2 deletes the subscriber information of UE 1, releases the connection with S-CSCF 42, and transmits SIP-200 OK to S-CSCF 42 (step E7).

When SIP-200 OK is received, S-CSCF 42 transmits Dia-Cx-RTA (Registration-Termination-Answer) to HSS/MAPGW 6 (step E8).

When Dia-Cx-RTA is received, HSS/MAPGW 6 deletes the subscriber information of UE 1 (step E9).

HLR 8 transmits MAP-Insert Subscriber Data to MSC 93 (step E10). When MAP-Insert Subscriber Data is received, MSC 93 returns MAP-Insert Subscriber Data Ack (step E11). HLR 8 returns MAP-Update Location Ack to MSC 93 (step E12). In this way, the location information of UE 1 is registered in VLR of MSC 93 in the Macro network (step E13).

When Dia-Cx-RTR is received in step E5, S-CSCF 42 not only transmits SIP:NOTIFY indicating the deletion of the subscriber information to Femto AP 2 in step E6, but also transmits SIP:NOTIFY indicating the deletion of the subscriber information to CBC/AS 96 (step E14).

When SIP:NOTIFY indicating the deletion of the subscriber information is received, CBC/AS 96 deletes the identification information of UE received from the database stored in CBC/AS 96 and transmits SIP-200 OK to S-CSCF 42 (step E15).

Figure 14:
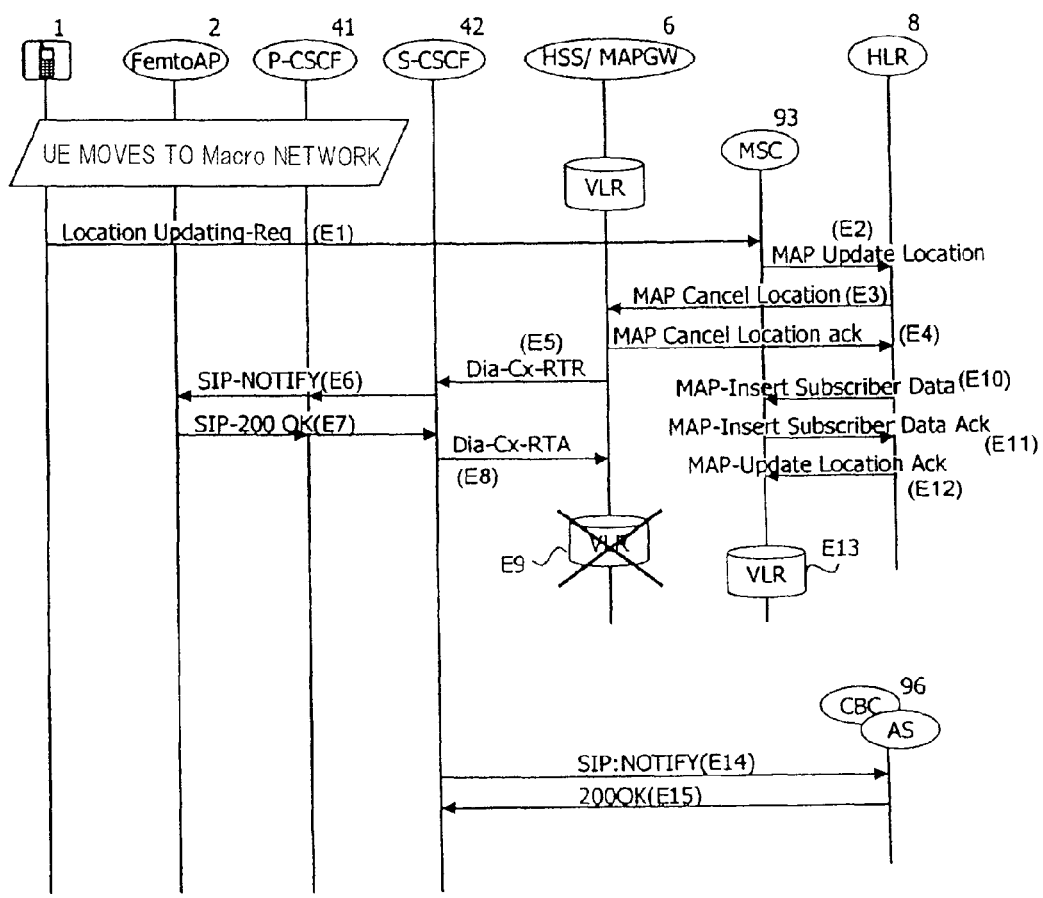
FIG. 14 is a sequence diagram showing an example of an operation when UE 1 has moved from under the control of Femto AP to a Macro network.

As in the example of operation of FIG. 14, in Case #6 of FIG. 7, in other words, when the contract of UE is canceled by the user, the subscriber information of UE 1 in HSS/MAPGW 6 is deleted (step E9) when the MAP-Cancel Location invocation is received from HLR 8 (step E3), and S-CSCF 42 transmits IP:NOTIFY indicating the deletion of the subscriber information to Femto AP 2 and CBC/AS 96 (steps E6 and E14).

In this way, the information of UE 1 in Femto AP 2 and CBC/AS 96 is deleted.

An operation of CBC/AS 96 broadcasting the CBS message to UE 1 existing in the Femto IMS network will be described with reference to FIG. 15.

When an instruction to distribute the CBS message is received from CBE 97 (step F1), CBC/AS 96 refers to the database stored in CBC/AS 96 and transmits SIP:MESSAGE to all Femto APs 2 included in the area sections of the administrative boundary information corresponding to "forecast areas" to which the distribution of the CBS message has been instructed.

Various methods indicating the types of request are defined in the SIP message. CBC/AS 96 of the exemplary embodiment sets SABP (Service Area Broadcast Protocol) to the body section of a request message by the MESSAGE method of SIP and adds the distribution content to be distributed as the CBS message and the location information of Femto AP 2 to the message before transmission to Femto AP 2 (step F2).

In SIP:MESSAGE transmitted by CBC/AS 96 in step F2, a source address (Source IP Address) is set as the IP address of CBC/AS 96, and a destination address (Destination IP Address) is set as the IP address of Femto AP 2. More specifically, SIP: MESSAGE distributed from CBC/AS 96 in step F2 is directly transmitted to the IP address (Inner-IP) of Femto AP 2 allocated from PDG 3, without passing through P-CSCF 41 or S-CSCF 42.

It is assumed that CBC/AS 96 and Femto AP 2 support only Write-Replace for SABP set in transmitted and received SIP: MESSAGE among various message types defined for the existing 3G network.

When SIP: MESSAGE is received, Femto AP 2 recognizes that SIP: MESSAGE is SIP:MESSAGE transmitted from CBC/AS 96 based on the source address, from header, and the like and accepts SIP:MESSAGE. If received SIP: MESSAGE is from a location other than CBC/AS96, Femto AP 2 discards SIP: MESSAGE without accepting SIP: MESSAGE in order to maintain the security.

Femto AP 2 compares SAI registered in advance by Femto AP-OSS 21 and SAI in SIP: MESSAGE received from CBC/AS 96. If SAIs coincide, Femto AP 2 converts the distribution content of the CBS message included as SABP:Write-Replace at the Body section of SIP:MESSAGE to BMC (Broadcast/Multicast Control) similar to the existing 3G network and transmits BMC to each UE 1 under control (step F3).

Once informing of the CBS message to UE 1 is completed, Femto AP 2 returns SIP-200 OK to CBC/AS 96 (step F4). CBC/AS 96 handles received SIP-200 OK as SABP:Write-Replace-Complete and accepts the CBS message as an informing completion notification.

An example of operation upon a distribution failure in the distribution of CBS messages distribution in FIG. 15 will be described.

In step F2, if SAIs do not coincide when Femto AP 2 receives SIP:MESSAGE from CBC/AS 96, and if SAI registered in advance by Femto AP-OSS 21 and SAI in SIP: MESSAGE received from CBC/AS 96 are compared, Femto AP 2 discards the distribution content without distributing the CBS message to UE 1 and returns an error response of SIP-4xx to CBC/AS 96 (step F5).

CBC/AS 96 handles received SIP-4xx as SABP:Write-Replace-Failure and accepts SIP-4xx as a distribution failure notification of the CBS message.

Similarly, when the CBS message is not normally distributed to UE 1 due to an internal error of Femto AP 2 or the like, Femto AP 2 returns the error response of SIP-4xx to CBC/AS 96.

An advantage of the example of the operation of distributing operation of the CBS message shown in FIG. 15 will be described.

The IP address of Femto AP 2 is allocated from PDG 3. Therefore, the allocated IP address changes if Femto AP 2 is reactivated.

In the example of operation, Femto AP 2 uses SAI that does not change even after the reactivation of Femto AP 2 or the like to check SIP:MESSAGE from CBC/AS 96. Therefore, wrong distribution caused by the change in the IP address can be prevented, and the CBS message can be surely distributed.

Another example of operation of broadcasting the CBS message from CBC/ASS 96 will be described with reference to FIG. 16.

Figure 16:
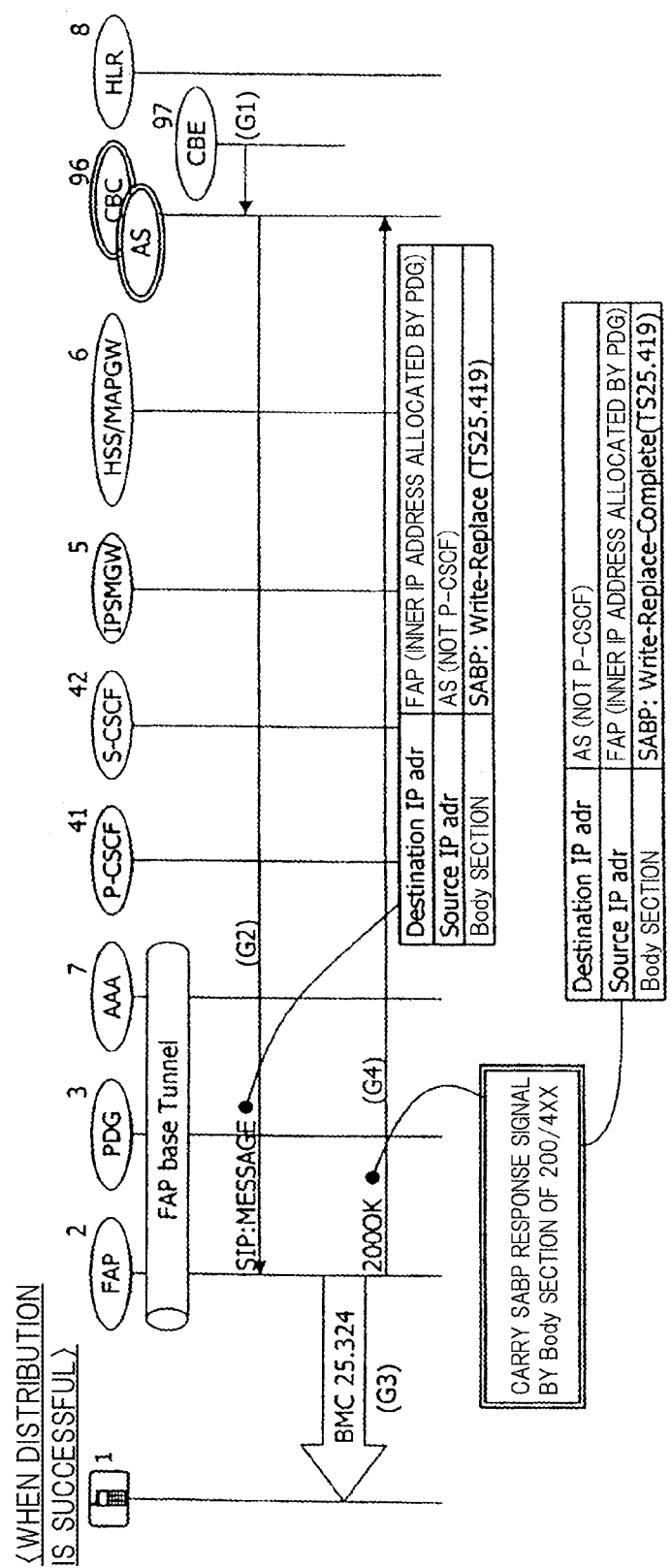
FIG. 16 is a sequence diagram showing another example of an operation of the CBS message broadcast.

In the example of operation of FIG. 16, Femto AP 2 receives SIP:MESSAGE from CBC/AS 96 by an operation similar to steps F1 and F2 in the example of operation of FIG. 15 (steps G1 and G2).

Femto AP 2 compares SAI set in SIP:MESSAGE received from CBC/AS 96 and SAI registered in advance in Femto AP-OSS 21. If SAIs coincide, Femto AP 2 converts the CBS message to BMC and transmits BMC to each UE 1 under control by an operation similar to step F3 (step G3).

In this way, when informing of the CBS message to UE 1 is completed, Femto AP 2 returns SIP-200 OK to CBC/AS 96 (step G4). Femto AP 2 adds the information of SABP:Write-Replace-Complete to the Body section of SIP-200 OK, sets the address of Femto AP 2 as the source address, and sets the address of CBC/AS 96 as the destination address.

After the reception of SIP: MESSAGE in step G2, Femto AP 2 compares SAI in SIP: MESSAGE received from CBC/AS 96 and SAI registered in advance in Femto AP-OSS 21. If SAIs does not coincide, Femto AP 2 discards the distribution content without distributing the CBS message to UE 1 and returns the error response of SIP-4xx to CBC/AS 96. Femto AP 2 adds the information of SABP:Write-Replace-Failure to the Body section of SIP-4xx, sets the address of Femto AP 2 as the source address, and sets the address of CBC/AS 96 as the destination address.

As described, in the example of operation shown in FIG. 16, since an SABP response signal is included at the Body section of SIP-200 OK or SIP-4xx is returned from Femto AP 2 to CBC/AS 96, CBC/AS 96 can check the response signal, and wrong distribution of the CBS message can be more surely prevented. Therefore, the CBS message can be more surely distributed.

Yet another example of the operation of broadcasting the CBS message from CBC/AS 96 will be described with reference to FIG. 17.

Figure 17:
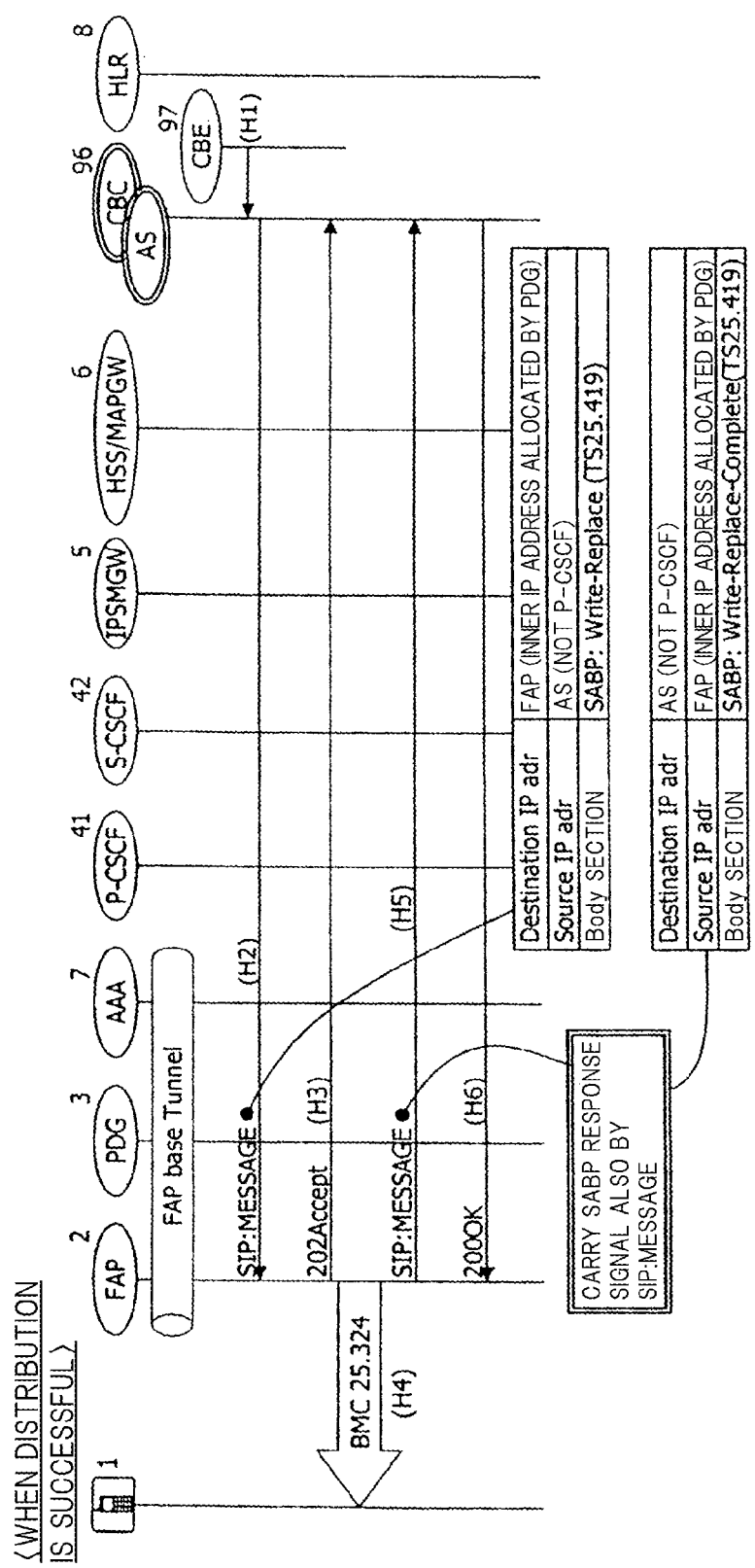
FIG. 17 is a sequence diagram showing yet another example of an operation of the CBS message broadcast.

In the example of operation of FIG. 17, Femto AP 2 receives SIP:MESSAGE from CBC/AS 96 by an operation similar to steps F1 and F2 in the example of the operation of FIG. 15 (steps H1 and H2). Femto AP 2 returns SIP-202Accept to CBC/AS 96 (step H3) and compares SAI set in SIP: MESSAGE received from CBC/AS 96 and SAI registered in advance by Femto AP-OSS 21. If SAIs coincide, Femto AP 2 converts the CBS message to BMC and transmits BMC to each UE 1 under control by an operation similar to step F3 of FIG. 14 (step H4).

When informing of the CBS message to UE 1 is completed, Femto AP 2 returns SIP:MESSAGE to CBC/AS 96 (step H5). Femto AP 2 adds information of SABP:Write-Replace-Complete to the Body section of SIP:MESSAGE, sets the address of Femto AP 2 as the source address, and sets the address of CBC/AS 96 as the destination address.

When SIP:MESSAGE is received, CBC/AS 96 returns SIP-200 OK to Femto AP 2 (step H6).

After the reception of SIP:MESSAGE in step H2, Femto AP 2 returns SIP-202Accept to CBC/AS 96 and compares SAI set in SIP:MESSAGE received from CBC/AS 96 and SAI registered in advance by Femto AP-OSS 21. If SAIs do not coincide, Femto AP 2 discards the distribution content without distributing the CBS message to UE 1, adds the information of SABP:Write-Replace-Failure to the Body section of SIP:MESSAGE, and returns SIP:MESSAGE to CBC/AS 96. For SIP:MESSAGE, Femto AP 2 sets the address of Femto AP 2 as the source address and sets the address of CBC/AS 96 of the destination address, as in step H5.

When SIP:MESSAGE is received, CBC/AS 96 returns SIP-200 OK to Femto AP 2 as in step H6.

As described, in the example of operation shown in FIG. 17, Femto AP 2 returns SIP-202Accept to SIP:MESSAGE from CBC/AS 96. Femto AP 2 uses SIP:MESSAGE in the return message from Femto AP 2 to CBC/AS 96 and adds the SABP response signal to the Body section. Therefore, the communication between Femto AP 2 and CBC/AS 96 can be check without fail, and wrong distribution of the CBS message can be prevented without fail. Therefore, the CBS message can be more surely distributed.

As described, according to the exemplary embodiment, as CBC/AS 96 collects the location information of Femto AP 2 and the identification information of UE, the association of the location information of Femto AP 2, the identification information of UE under the control, the administrative boundary information, and the area sections of "forecast areas" is updated every time the information is collected. Therefore, CBC/AS 96 can manage areas to surely distribute the CBS message in the communication system including Femto AP 2 without fail.

Furthermore, Femto AP 2 checks the wrong distribution by SAI in broadcasting of the CBS message. Therefore, the CBS message with high urgency can be distributed without fail to UE under the control of Femto AP 2 at a predetermined area section without erroneously distributing the message.

The exemplary embodiments are preferred embodiments of the present invention. The present invention is not limited to the exemplary embodiments, and various changes can be made to carry out the present invention based on the technical concept of the present invention.

For example, although the communication system comprises P-CSCF and S-CSCF in the exemplary embodiments, only one call state control server may be included if the server can function as CSCF. In that case, the call state control server includes functions of P-CSCF and S-CSCF in the exemplary embodiments.

The "apparatus" in the present specification denotes a logical set of hardware and software (or functional modules that realize predetermined functions) for realizing predetermined functions, and whether the apparatuses and the functional modules are within a single housing is not particularly in question.

In the description of the exemplary embodiments, the distribution area section denotes the administrative boundary information and the "forecast area" in relation to the database for area management of CBC/AS 96, and the location information of Femto AP 2 and the identification information of UE 1 are associated in the administrative boundary information. However, the configuration is not limited to this if the CBS message can be distributed to Femto AP 2 that is present in a predetermined distribution area section, and the distribution area section may be other sections.

Although the configuration of distributing the CBS message has been described in the exemplary embodiments, CBC/AS 96 may be configured to manage the end-user information, such as the location information of Femto AP 2, to provide other services.

For example, a "nonexistence/existence service" of notifying a registered user of the notification service of the existence in the area if UE of the user registered as a notification target that is present under the control of Femto AP 2 can be provided. In the nonexistence/existence service, for example, a parent or a family as the registered user of the notification service registers whether UE of a child that is present under the control of Femto AP 2 at home as a notification target, and a notification of returning of the child can be remotely received.

The configuration of the service can be realized by CBC/AS 96 managing only UE.IMSI, MSISDN, and FAP IP address at the minimum, and the management target data of the database can be simplified. Based on the end-user information management of CBC/AS 96, when notification target UE exists under the control of Femto AP 2, the existence is transmitted to registered user UE of the notification service as in the exemplary embodiments.

The processing procedures for realizing the apparatuses, such as Femto AP 2, S-CSCF 42, and CBC/AS 96, as the exemplary embodiments, can be recorded in a recording medium as programs to cause a CPU of a computer forming the system to execute the processes by the programs supplied from the recording medium to realize the functions in the exemplary embodiments.

In that case, the present invention is also applied when an information group including the programs is supplied from the recording medium, or from an external recording medium through a network, to the output apparatus. More specifically, program codes that are read out from the recording medium realize new functions of the present invention, and the recording medium storing the program codes and signals that are read out from the recording medium constitute the present invention.

Examples of the recording medium that can be used include a flexible disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and ROM.

The programs according to the present invention can cause the apparatuses controlled by the programs to realize the functions in the exemplary embodiments.

Configurations of the apparatuses of the communication system will be described.

Figure 18:
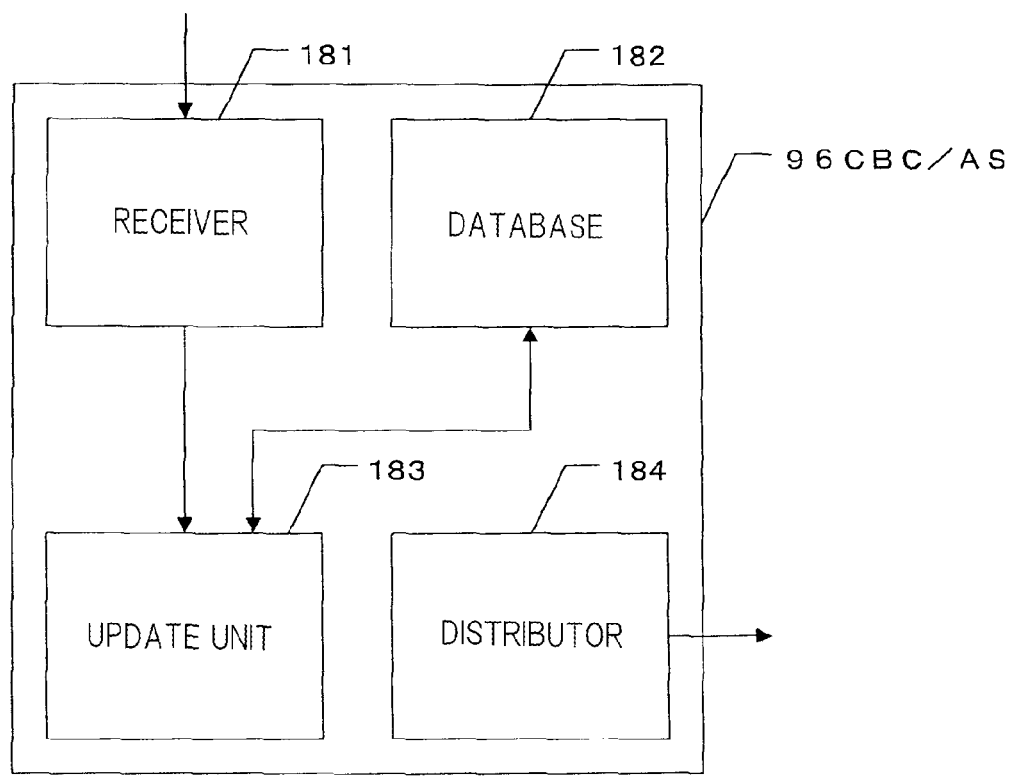
FIG. 18 is a diagram showing a configuration of CBC/AS 96.

FIG. 18 is a diagram showing a configuration of CBC/AS 96. In FIG. 18, CBC/AS 96 comprises receiver 181, database 182, update unit 183, and distributor 184.

Receiver 181 receives a 3rd Party Register signal storing the location information of Femto AP 2.

Database 182 relates and stores predetermined distribution area sections and the location information of Femto AP 2 that is present in the distribution area sections.

Update unit 183 updates the association in database 182 based on the location information in the 3rd Party Register signal every time the 3rd Party Register signal is received by receiver 181.

Distributor 184 identifies Femto AP 2 that is present in a distribution area as a distribution target based on database 182 and broadcasts, to Femto AP 2, the SIP message of the MESSAGE method including the distribution content in the broadcast. In this case, distributor 184 adds the location information of Femto AP 2 to the SIP message.

Figure 19:
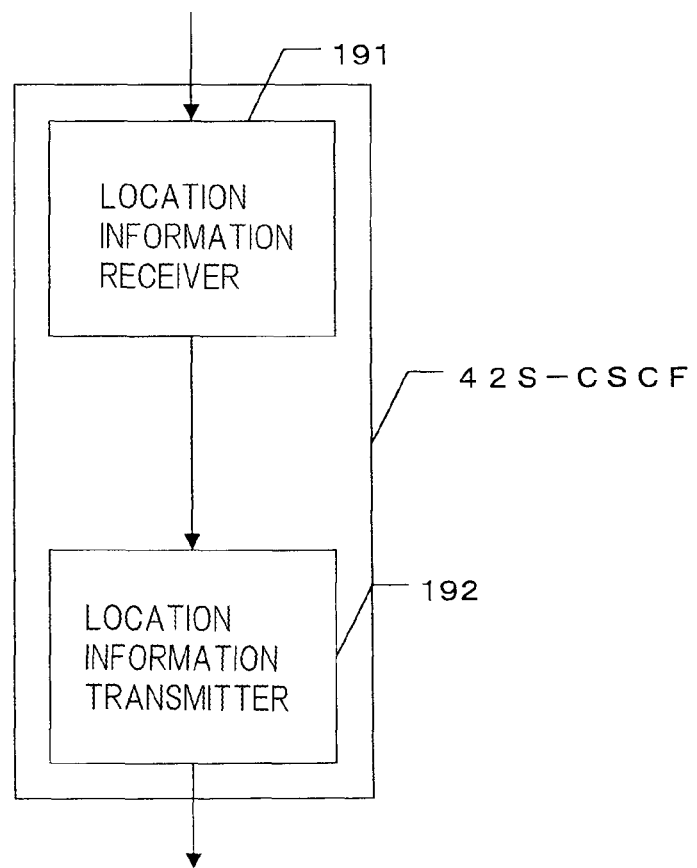
FIG. 19 is a diagram showing a configuration of S-CSCF 42.

FIG. 19 is a diagram showing a configuration of S-CSCF 42. In FIG. 19, S-CSCF 42 comprises location information receiver 191 and location information transmitter 192.

Location information receiver 191 receives the SIP message storing the location information of Femto AP 2.

Based on a predetermined trigger, location information transmitter 192 transmits the SIP message received by location information receiver 191 to CBC/AS 96 as a request message of the Register method. The trigger is a predetermined timing during the location registration operation of Femto AP 2 or UE 1 that is present under the control of Femto AP 2. More specifically, the trigger is a timing of the completion of a predetermined process in the location registration operation of Femto AP 2 or UE 1 that is present under the control of Femto AP 2.

Figure 20:
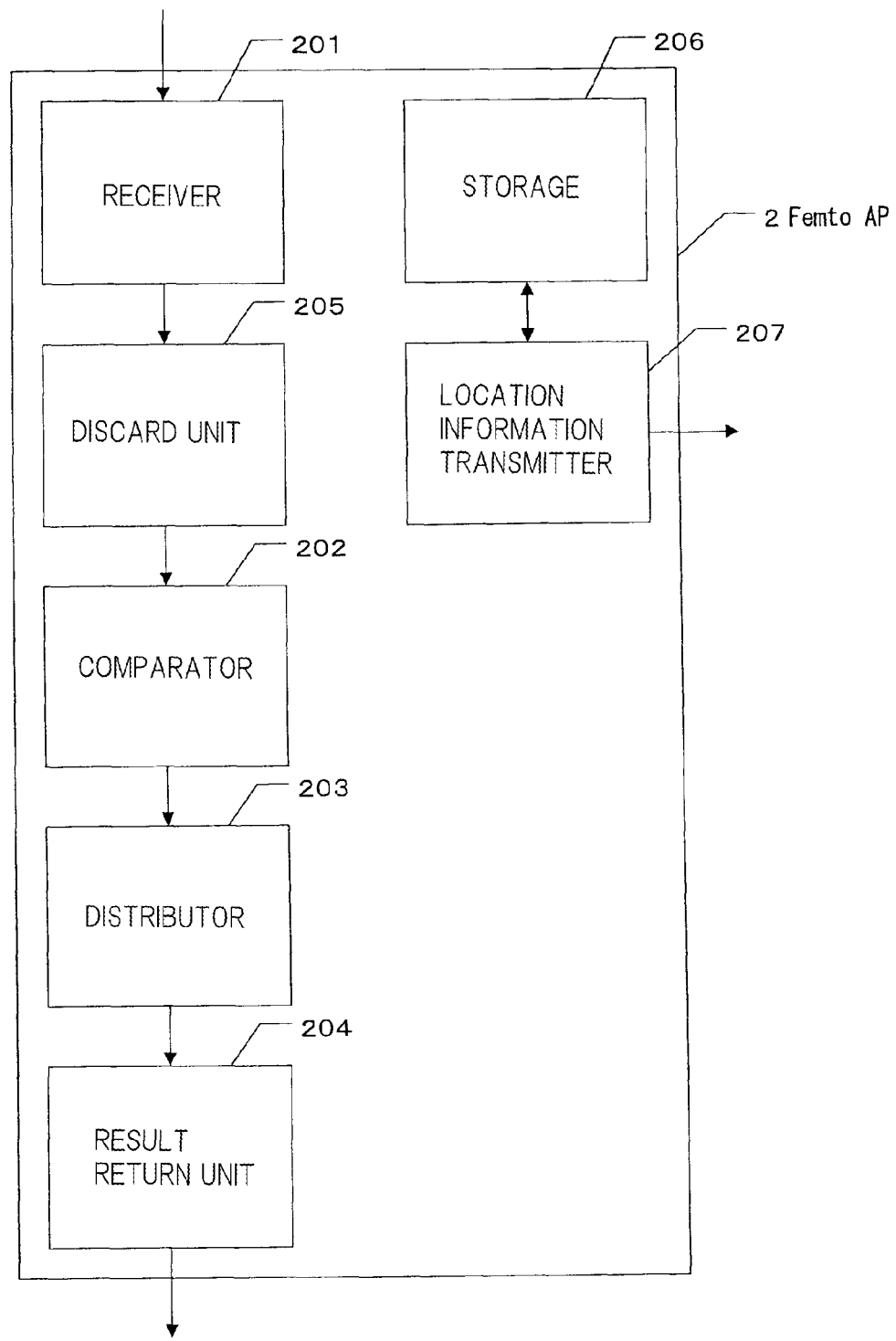
FIG. 20 is a diagram showing a configuration of Femto AP 2.

FIG. 20 is a diagram showing a configuration of Femto AP 2. In FIG. 20, Femto AP 2 comprises receiver 201, comparator 202, distributor 203, result return unit 204, discard unit 205, storage 206, and location information transmitter 207.

Receiver 201 receives a broadcast message, which includes the distribution content in the broadcast and which is a SIP message of the MESSAGE method, from CBC/AS 96.

ASI of Femto AP2 is registered in advance in comparator 202. Comparator 202 compares the registered ASI and ASI in the location information included in the broadcast message.

If ASIs compared by comparator 202 coincide, distributor 203 broadcasts the distribution content in the broadcast message to UE 1 that is wirelessly connected to Femto AP 2.

On the other hand, if ASIs compared by comparator 202 do not coincide, distributor 203 discards the distribution content in the broadcast message without distributing the content.

When distributor 203 broadcasts or discards the distribution content, result return unit 204 returns the distribution result (SIP-200 OK or error response of SIP-4xx), which indicates whether the broadcast is performed, to CBC/AS 96.

Discard unit 205 discards the broadcast message before the comparison of ASIs by comparator 202 if the source of the broadcast message is not CBC/AS 96.

Storage 206 stores the location information of Femto AP 2.

Based on a predetermined trigger, location information transmitter 207 transmits the SIP message including the location information stored in storage 206 to CBC/AS 96 by a request message of the Register method. The trigger may be a predetermined timing in the location registration operation of Femto AP 2 or UE 1 that is present under the control of Femto AP 2 or may be a predetermined timing in the authentication operation of Femto AP 2.

This application claims the benefit of priority based on Japanese Patent Application No. 2010-9414 filed Jan. 19, 2010, the entire disclosure of which is hereby incorporated by reference.

The invention claimed is:

1. A broadcast control apparatus that performs broadcasting to a terminal wirelessly connected to a femto cell base station, the broadcast control apparatus comprising:
a receiver that receives location information of the femto cell base station and identification information of a terminal wirelessly connected to the femto base station;
a database that stores a distribution area, an association between the distribution area and the location information of the femto cell base station, and the identification information of the terminal wirelessly connected to the femto base station, wherein the femto cell base station is located within the distribution area;
an update unit that updates the database based on the location information received by the receiver; and
a distributor that broadcasts a Session Initiation Protocol (SIP) message, including distribution content, to the femto cell base station that is located within the distribution area and is wirelessly connected to the terminal, wherein the distributor does not transmit the SIP message to a femto cell base station not wirelessly connected to a terminal.

2. The broadcast control apparatus according to claim 1, wherein
the location information of the femto cell base station received by the receiver includes registered location information registered in advance in the femto cell base station, and
the distributor adds the registered location information to the SIP message.

3. The broadcast control apparatus according to claim 1, wherein
the location information of the femto cell base station includes latitude/longitude information of the femto cell base station, and
the update unit updates the association between the distribution area and the femto cell base station based on the latitude/longitude information included in the location information of the femto cell base station received by the receiver.

4. The broadcast control apparatus according to claim 1, wherein
the update unit updates an association in the database, between the distribution area and the femto cell base station every time the receiver receives the location information.

5. A call state control apparatus connected to a femto cell base station and a broadcast control apparatus that performs broadcasting to a terminal that is wirelessly connected to the femto cell base station, the call state control apparatus comprising:
a location information receiver that receives a Session Initiation Protocol (SIP) message including location information of the femto cell base station and identification information of a terminal that is present under the control of the femto cell base station; and
a location information transmitter that transmits the SIP message, including the location information of the femto cell base station and the identification information, to the broadcast control apparatus based on an occurrence of a predetermined trigger.

6. The call state control apparatus according to claim 5, wherein
the predetermined trigger comprises one of a location registration operation of the femto cell base station and a location registration operation of the terminal that is wirelessly connected to the femto cell base station.

7. The call state control apparatus according to claim 5, wherein
the predetermined trigger comprises one of completion of a predetermined process in a location registration operation of the femto cell base station and completion of a predetermined process in a location registration operation of the terminal that is wirelessly connected to the femto cell base station.

8. The call state control apparatus according to claim 5, wherein
the SIP message is a request message transmitted according to a Register method.

9. A femto cell base station used in a communication system comprising a broadcast control apparatus that performs broadcasting, the femto cell base station comprising:
a receiver that receives a broadcast message from the broadcast control apparatus, the broadcast message including distribution content and location information;
a comparator that compares registered location information registered in the femto cell base station and the location information included in the broadcast message; and
a distributor that broadcasts the distribution content of the broadcast message to a terminal that is wirelessly connected to the femto cell base station, if the registered location information coincides with the location information included in the broadcast message.

10. The femto cell base station according to claim 9, wherein
the distributor discards the distribution content of the broadcast message without broadcasting if the registered location information does not coincide with the location information included in the broadcast message.

11. The femto cell base station according to claim 9, further comprising
a result return unit that returns a distribution result indicating whether broadcasting has been performed by the distributor.

12. The femto cell base station according to claim 9, wherein
the broadcast message received by the receiver is a Session Initiation Protocol (SIP) message.

13. The femto cell base station according to claim 9, wherein
the distributor discards the broadcast message if a source of the broadcast message is not the broadcast control apparatus.

14. A communication system comprising:
a broadcast control apparatus that performs broadcasting, the broadcast control apparatus comprising:
- a receiver that receives location information of the femto cell base station and identification information of a terminal wirelessly connected to the femto cell base station;
- a database that stores a distribution area, an association between the distribution area and the location information of the femto cell base station, and the identification information of the terminal wirelessly connected to the femto cell base station, wherein the femto cell base station is located within the distribution area; and
- an update unit that updates the database based on the location information received by the receiver; and
- a distributor that broadcasts a Session Initiation Protocol (SIP) message, including distribution content, to the femto cell base station that is wirelessly connected to the terminal, wherein the distributor does not transmit the SIP message to a femto cell base station not wirelessly connected to a terminal;

a call state control apparatus connected to the femto cell base station and the broadcast control apparatus that performs broadcasting to the terminal that is wirelessly connected to the femto cell base station, the call state control apparatus comprising:
- a location information receiver that receives a SIP message including the location information of the femto cell base station; and
- a location information transmitter that transmits the SIP message, including the location information of the femto cell base station, to the broadcast control apparatus based on an occurrence of a predetermined trigger; and the femto cell base station comprising:
- a receiver that receives a broadcast message from the broadcast control apparatus, the broadcast message including distribution content and location information;
- a comparator that compares registered location information registered in the femto cell base station and the location information included in the broadcast message; and
- a distributor that broadcasts the distribution content of the broadcast message to the terminal that is wirelessly connected to the femto cell base station, if the registered location information coincides with the location information included in the broadcast message.

15. A communication control method in a communication system comprising a femto cell base station and a broadcast control apparatus that performs broadcasting to an terminal that is wirelessly connected to the femto cell base station, the communication control method comprising:
- the broadcast control apparatus receiving location information of the femto cell base station and identification information of the terminal wirelessly connected to the femto cell base station;
- the broadcast control apparatus updating an association between a distribution area and location information of the femto cell base station, based on the received location information of the femto cell base station;
- and the broadcast control apparatus transmitting a Session Initiation Protocol (SIP) message, including distribution content, to the femto cell base station that is located within the distribution area and is wirelessly connected to the terminal, wherein the distributor does not transmit the SIP message to a femto cell base station not wirelessly connected to a terminal.

16. The communication control method according to claim 15, wherein
the received location information of the femto cell base station includes registered location information registered in advance in the femto cell base station, and
the method further comprises adding at least the registered location information of the femto cell base station to the SIP message when the SIP message is transmitted.

17. The communication control method according to claim 15, wherein
the location information of the femto cell base station includes latitude/longitude information, and
the method further comprises updating the association between the distribution area and the femto cell base station based on the latitude/longitude information of the femto cell base station included in the received location information of the femto cell base station.

18. The communication control method according to claim 15, further comprising
updating the association between the distribution area and the femto cell base station every time the location information of the femto cell base station is received.

* * * * *

UNITED STATES PATENT AND TRADEMARK OFFICE
CERTIFICATE OF CORRECTION

| | | |
|---|---|---|
| PATENT NO. | : 8,880,094 B2 | Page 1 of 1 |
| APPLICATION NO. | : 13/522874 | |
| DATED | : November 4, 2014 | |
| INVENTOR(S) | : Osamu Kurokawa et al. | |

It is certified that error appears in the above-identified patent and that said Letters Patent is hereby corrected as shown below:

In the Specification

Column 12, Line 37: Delete "AS" and insert -- A5 --

Column 13, Line 45: Delete "A11" and insert -- A17 --

Signed and Sealed this
Fourth Day of August, 2015

Michelle K. Lee
*Director of the United States Patent and Trademark Office*